United States Patent [19]
Hamanaka et al.

[11] Patent Number: 5,119,537
[45] Date of Patent: Jun. 9, 1992

[54] METHOD FOR ASSEMBLING THE ACTUATOR MECHANISMS OF A MAGNETIC DISK APPARATUS

[75] Inventors: Kunio Hamanaka, Tokyo; Yoshiki Sakurai, Ohme; Hideyuki Miyazaki, Tokorozawa; Hiroyuki Kuno, Koganei; Keigo Takahashi, Tokyo; Machio Shimanuki, Ohme, all of Japan

[73] Assignee: Kabushiki Kaisha Toshiba, Kawasaki, Japan

[21] Appl. No.: 614,978

[22] Filed: Nov. 16, 1990

Related U.S. Application Data

[60] Division of Ser. No. 452,281, Dec. 18, 1989, abandoned, which is a continuation of Ser. No. 76,187, Jul. 22, 1987, abandoned.

[30] Foreign Application Priority Data

| Jul. 22, 1986 | [JP] | Japan | 61-111476[U] |
| Sep. 4, 1986 | [JP] | Japan | 61-134826[U] |
| Dec. 9, 1986 | [JP] | Japan | 61-188579[U] |
| Jan. 31, 1987 | [JP] | Japan | 62-21300 |
| Jan. 31, 1987 | [JP] | Japan | 62-21434 |
| Jun. 30, 1987 | [JP] | Japan | 62-162968 |
| Jun. 30, 1987 | [JP] | Japan | 62-163120 |
| Jun. 30, 1987 | [JP] | Japan | 62-163126 |

[51] Int. Cl.$^5$ ............................................. G11B 5/42
[52] U.S. Cl. ............................................. 29/603; 29/737; 360/104; 360/106
[58] Field of Search ............... 29/603, 737, 757, 760; 360/104, 105, 106

[56] References Cited

U.S. PATENT DOCUMENTS 4,739,430  4/1988  Manzke et al. ............... 360/106
4,835,641  5/1989  Maeda ............................ 360/104

Primary Examiner—Carl E. Hall
Attorney, Agent, or Firm—Foley & Lardner

[57] ABSTRACT

A magnetic disk apparatus, a method for assembling an actuator mechanism thereof and an assembling unit of the actuator mechanism, wherein a plurality of head arms are installed integrally onto an arm supporting block and a head assembly is fixed to these head arms by use of arm mounting assembly. Also, an assembling method and assembling unit suitable for installing the head assembly to the head arm in the case that a plurality of head arms are installed integrally onto the arm supporting block. Because a plurality of head arms are installed integrally onto the arm supporting block, its assembling work is simple, the cost is decreased, and still more it is possible to effectively reduce a latent off-track of magnetic head.

5 Claims, 20 Drawing Sheets

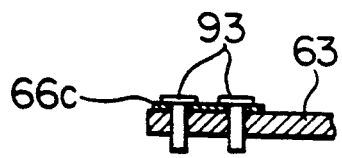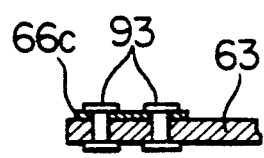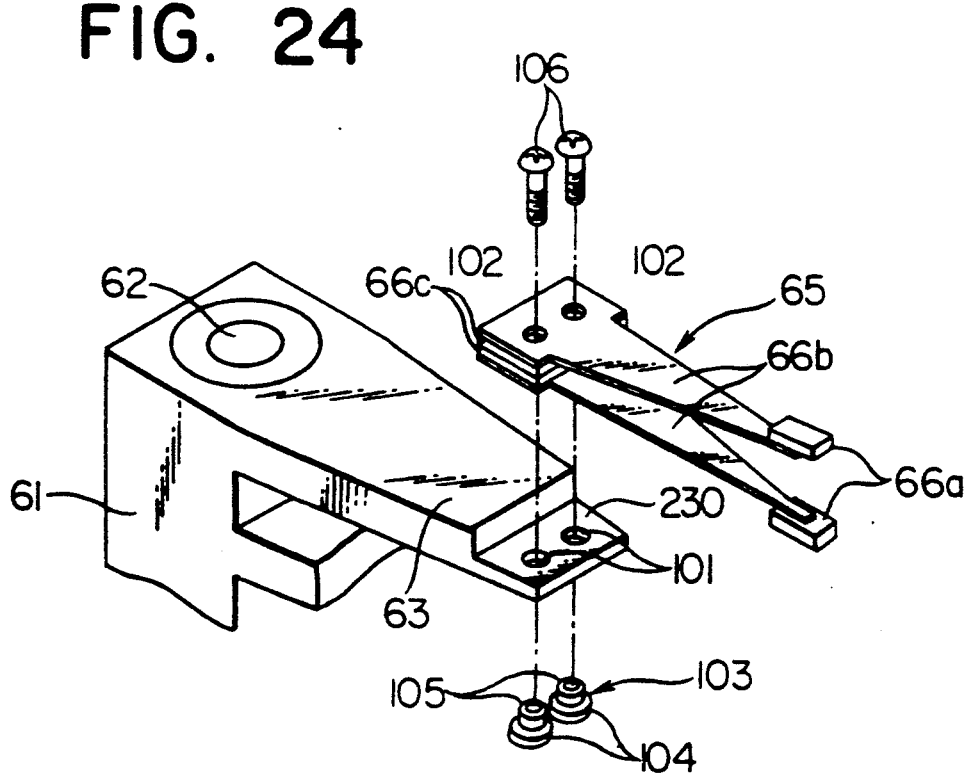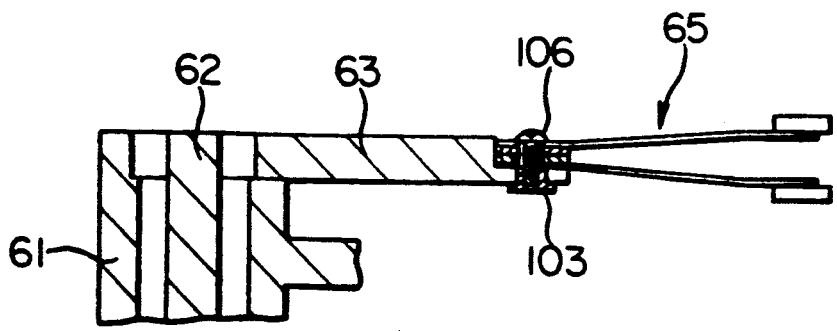

METHOD FOR ASSEMBLING THE ACTUATOR MECHANISMS OF A MAGNETIC DISK APPARATUS

This application is a division, of application Ser. No. 07/452,281, filed Dec. 18, 1989, now abandoned, which is a continuation of application Ser. No. 07/076,187, filed Jul. 22, 1987, now abandoned.

The present application claims priority of Japanese Utility Model Applications No. 61-111476 filed on Jul. 22, 1986, No. 61-134826 filed on Sept. 4, 1986, and No. 61-188579 filed on Dec. 9, 1986, and U.S. patent applications Nos. 62-021434 and 62-021300 filed on Jan. 31, 1987 respectively and Petition Nos. 2, 20 and 26 filed on Jun. 30, 1987 respectively.

FIELD OF THE INVENTION AND RELATED ART STATEMENT

This invention relates to a magnetic disk apparatus, a method for assembling an actuator mechanism thereof, and an assembling unit for the actuator mechanism.

In recent years, in such information processing apparatus as a word processor and a personal computer, a magnetic disk apparatus is used as the external memory means.

The actuator mechanism in this type of magnetic disk apparatus has conventionally been structured of several component parts from its rotary center up to its magnetic head for recording and playing back information. The actuator mechanism in such a type of magnetic disk apparatus is constructed as follows.

This actuator mechanism serves to move a plurality of magnetic heads for writing in and reading out the data respectively for a plurality of magnetic disks which are arranged coxially and rotated in synchronization to each other.

The magnetic heads are mounted respectively, on the tips of respective suspensions. An arm mounting section is formed at the other end of the respective suspensions. Through-holes are provided to each arm mounting section, and the head assembly is comprised of a magnetic head suspension and an arm mounting section.

Each head assembly is fixed by arranging the through-holes on the arm mounting section in correspondence with the tapped holes formed at the tip of plurality of split head arms and by screwing the screws into the tapped holes.

Each head arm mounted to each head assembly is positioned in an identical direction on the arm supporting block, which has been arranged rotatably on the shaft, and is fixed thereon by bolts and nuts.

Also, a voice coil structuring a magnetic circuit is provided to the arm supporting block, and is arranged between a magnet and a yoke.

Next, the assembling method of the actuator mechanism of this magnetic disk will be described.

First, the through-holes, which has been formed on the arm mounting section of the head assembly, are arranged in correspondence to the tapped holes on each split head arm. Then, the screw is threaded into a tapped hole to fix each head assembly to the head arm.

Thereafter, respective head arms each fitted with a head assembly are arranged an identical direction and at a given interval from each other onto the arm supporting block, which has been installed rotatably onto the shaft. Further, at this time, its positioning shall be made in a way that the magnetic head at tip of each head assembly shall be arranged at the designated place on magnetic disk. And, in this state, the head arm shall be fixed to the arm supporting block by use of screws.

The actuator mechanism of the magnetic disk apparatus which has been structured in this way serves to move the magnetic head on the magnetic disk (making the head accessible to the disk) through a head arm and suspension as the arm supporting block is rotated by the magnetic circuit.

However, in the conventional type actuator mechanism for a magnetic disk apparatus, the arm mounting section of the suspension fitted with respective magnetic heads is connected by means of screws onto a plurality of split head arms. There arms are integrally connected to the arm supporting block by use of screws. Hence, there is thermal expansion and distortion to the connected area between arm supporting block and head arm on account of the temperature change inside the magnetic disk unit main body or such environmental changes as vibrations or shocks from external side, thereby the magnetic head at tip of suspension connected to the tip of head arm is likely to deviate out of the given position, thus involving a problematic point of causing problems such as off-tracking. Another problem is that, in assembling this actuator mechanism, the assembling work is complicated because a great number of parts with high accuracy are required.

OBJECT AND SUMMARY OF THE INVENTION

Therefore, the object of this invention is to provide a magnetic disk apparatus, a method for assembling of an actuator mechanism thereof and an assembling unit of the actuator mechanism capable of effectively reducing possible deviation of respective magnetic heads (deviation of the support head against the data head) coming from the temperature change caused inside the main body of the magnetic disk apparatus and such environmental changes as vibrations and shocks from an external source.

Another object of this invention is to provide the magnetic disk apparatus, the method for assembling of the actuator mechanism thereof as well as the assembling unit of the actuator mechanism capable of decreasing the number of required parts to simplify the assembling work and to enhance the assembling efficiency and still more capable of attempting the cost reduction.

Further, another object of this invention is to provide the magnetic disk apparatus, the method for assembling of the actuator mechanism thereof and the assembling unit of the actuator mechanism capable of not only decreasing the required number of parts by integrally forming a plurality of head arms with the arm supporting block but also obtaining stable characteristics by simplifying the head positioning.

The actuator mechanism of the magnetic disk apparatus of the present invention comprises a plurality of magnetic disks stacked concentrically with a rotary shaft and having a recording surface thereon, a plurality of head assemblies with magnetic heads for reading data from and writing data on the magnetic disks and a support means for flexibly supporting the magnetic heads with, a carriage having a plurality of assembly supporting means installed substantially in the same direction and substantially parallel with the rotary shaft of a plurality of the magnetic disks and coupling integrally each of a plurality of the assembly supporting means, and a connecting means for connecting the head assembly to the assembly supporting means of the carriage.

The method for assembling of the actuator mechanism of the magnetic disk apparatus of the present invention is carried out by passing the shaft of a screwdriver, having a screw tightening joint section at the tip thereof, through 1st to 2nd tapped holes respectively formed substantially on identical straight line of an assembly supporting means of a carriage having at least 1st and 2nd the assembly supporting means connected integrally, mounting 1st through-hole of the 1st head assembly which having 1st magnetic head at one end portion and 1st through-hole at the other end portion, in accordance with the 1st tapped hole facing at the 2nd assembly supporting means side of the 1st assembly supporting means, placing 1st thread member having thread portion to be screwed into the 1st tapped hole and head section where joint groove being engaged with the joint section of the screwdriver toward 1st tapped hole from 1st through-hole arranged on the 1st tapped hole, engaging the joint section of screwdriver of which shaft is passed through the 2nd tapped hole, to the joint groove of the 1st thread member arranged toward the 1st tapped hole, turning the screwdriver being engaged with the 1st thread member for screwing 1st thread member into the 1st tapped hole and for connecting 1st head assembly to the 1st assembly supporting means, and connecting 2nd head assembly to 2nd assembly supporting means by using 2nd thread member.

Also, the method for assembling of the actuator mechanism of the magnetic disk apparatus of the present invention is holding the actuator main body where a plurality of head arms having tapped holes in an identical straight line at respective tips are provided integrally on the arm supporting block so that the head arms may be positioned in a given direction, actuating and positioning in a given direction the above-mentioned arm mounting section of head assembly provided with the suspension having the arm mounting section in which the magnetic head is fitted to one end portion of each of the head arms and the through-holes in correspondence to tapped holes on the head arm are provided on the other end portion, to pass toward the other side from one side of tapped holes on head arms the shaft of screwdriver which as the shaft idly passed through the tapped holes and the through-holes and at whose end portion the screwing joint section is formed, positioning the through-holes on head assembly in correspondence to the tapped holes on head arm at the tip end side of the head arms from the through-hole side on the arm mounting section the thread section on thread member having the head section where the thread section joining the tapped holes and the joint groove joining the joint section on the screwdriver are formed, joining the joint section of the screwdriver to the joint groove at head section of this thread member for sequentially tightening and connecting the thread member first, and at the same time to space respective heads from each other of the head assembly when tightening and connecting the thread members.

Further, the assembling unit of the actuator mechanism of the present invention incorporates the actuator main body positioning means for holding and positioning the actuator main body in which the head arm is provided integrally to the arm supporting block, the head assembly positioning means for actuating and positioning the mounting section of head assembly in a given direction when installing to the positioned head arm the head assembly equipped with suspension to whose one end portion the head is fitted and the mounting section is formed on the other end portion, and the head spacing means provided with spacer which can be inserted between respective suspensions so as to separate respective heads from each other of head assembly when mounting the head assembly to the said head arm.

BRIEF DESCRIPTION OF THE DRAWINGS

FIGS. 22 and 23 are sectional views for explaining the assembled state of FIG. 21;

FIG. 24 is a disassembled perspective view for explaining the actuator mechanism as the 5th embodiment of the present invention;

FIG. 25 is a side sectional view of FIG. 24;

DETAILED DESCRIPTION OF PREFERRED EMBODIMENTS

Hereinafter, the embodiments of the present invention will be described in detail on the bases of the drawings.

Figure 1:
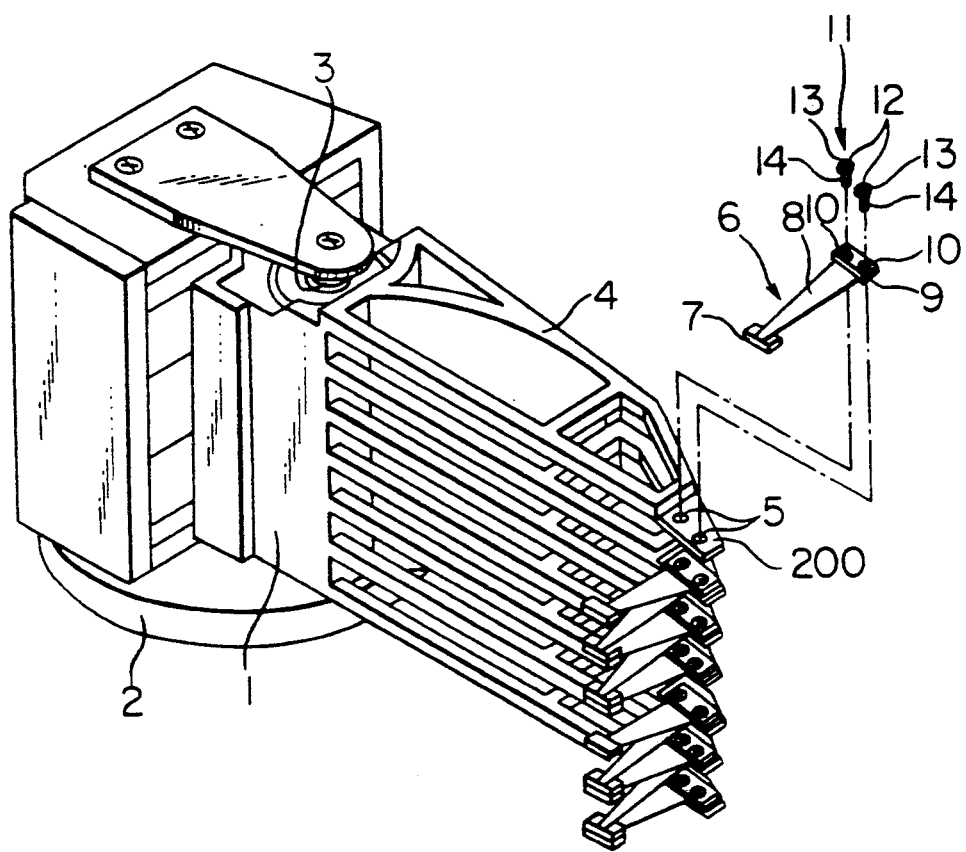
FIG. 1 is a perspective view showing the actuator mechanism of the magnetic disk apparatus as the 1st embodiment of the present invention.
Figure 2:
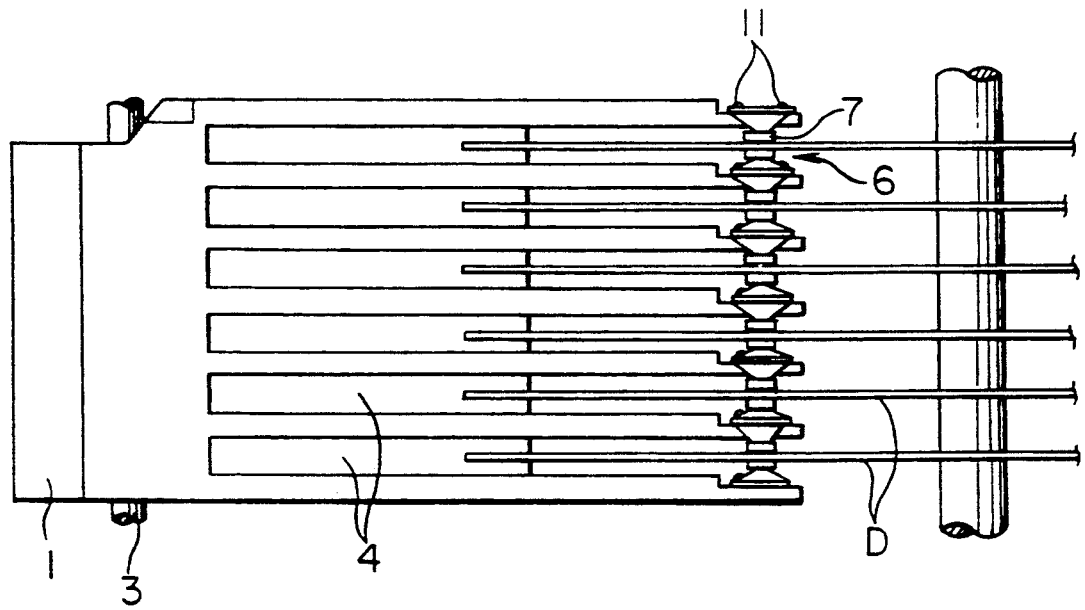
FIG. 2 is a side view of FIG. 1.
Figure 3:
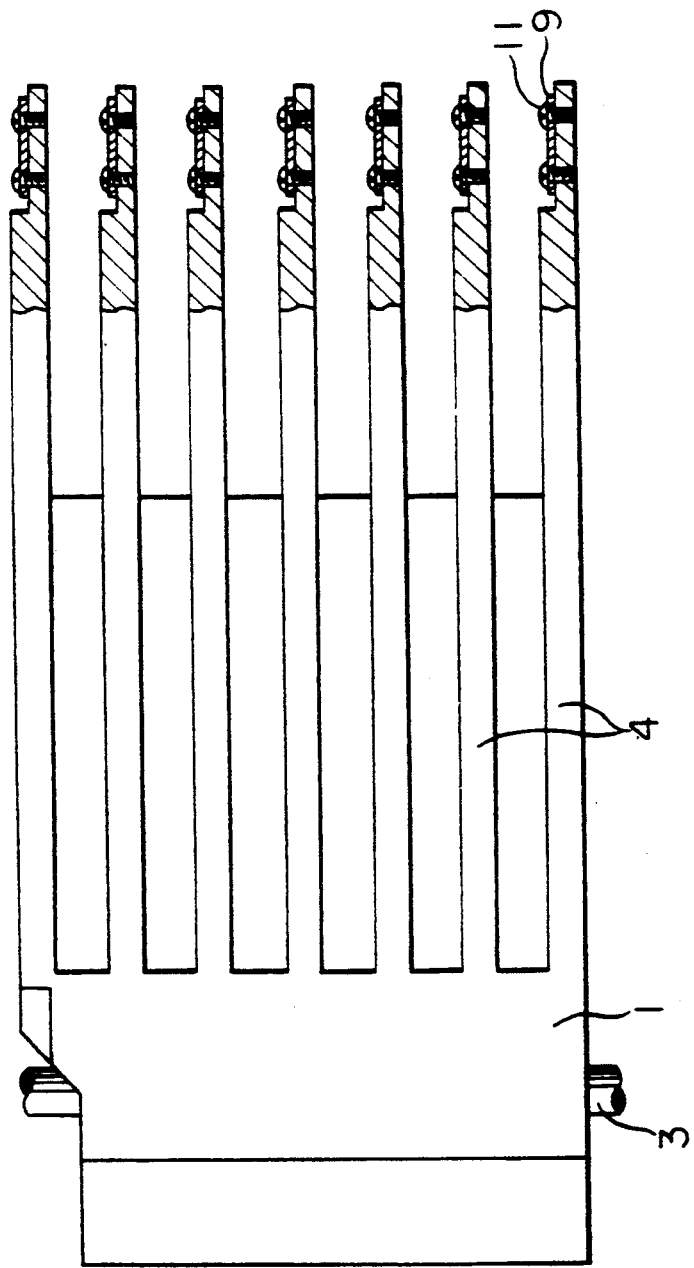
FIG. 3 is a partial sectional side view of FIG. 1.

FIG. 1 is a partially disassembled perspective view showing the actuator mechanism of magnetic disk apparatus as the 1st embodiment of the present invention, FIG. 2 is a side view of FIG. 1, and FIG. 3 is a partial side sectional view of FIG. 1.

In these figures, the arm supporting block 1, as the assembly supporting means, is installed rotatably onto the shaft 3 formed on the base 2. To this arm supporting block 1, a plurality of head arms 4 are integrally arranged in the same direction. To the tips of these head arms 4, assembly supporting means 200 are provided in the identical straight line across the rotary face. On each of the assembly supporting means 200 tapped holes 5 are provided on identical straight lines. The head assembly 6 includes the magnetic head 7 for writing in and reading out the data for the magnetic disk D, the suspension 8 as a supporting means for supporting the magnetic head 7 with flexibility, and the arm mounting section 9, which is provided on suspension 8. The arm mounting section 9 includes the through-holes 10 which correspond with tapped holes 5 of the head arm 4.

The through-holes 10 formed on the arm mounting section 9 of the head assembly 6, are arranged to correspond with the tapped holes 5 on the head arm 4 and are connected with screws by the thread member 11. The thread member 11 includes the head section 13 in which the joint groove 12 being joined to the screw tightening joint section of a screwdriver (described later) is formed, and the thread section 14 to join to the tapped holes 5. The actuator mechanism of the magnetic disk apparatus to be structured in this way can be assembled as shown in FIG. 4.

Figure 4:
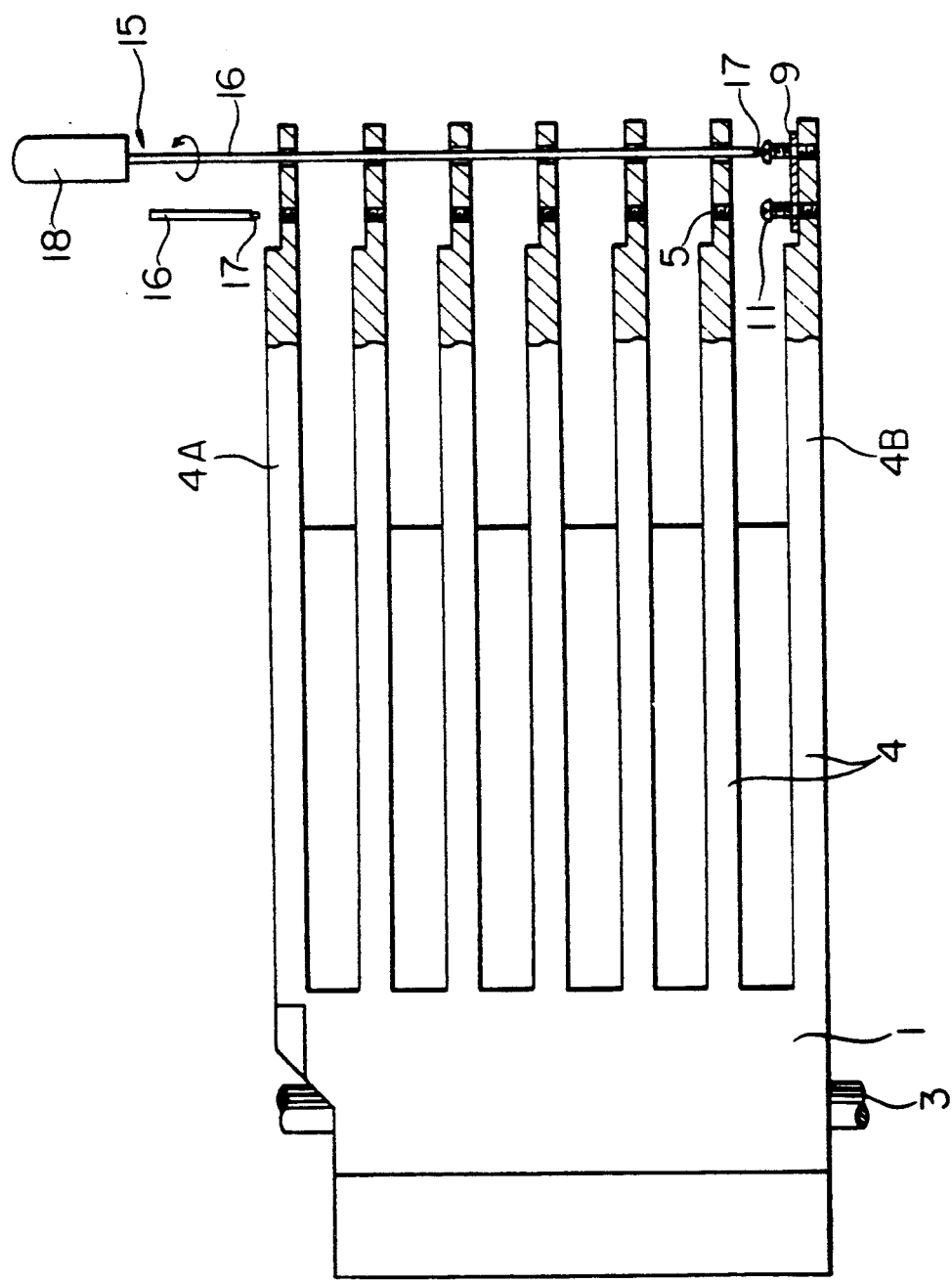
FIG. 4 is a partial sectional side view for explaining the assembling unit of the actuator mechanism of FIG. 1.

In FIG. 4, numeral 15 designates the screwdriver which includes a shaft section 16 made of, for example, super hard metal, the screw tightening joint section 17 being formed at tip of the shaft section 16, and grip portion 18 to which the shaft section is fitted. The shaft section 16 has an outside diameter which can be inserted into respective tapped holes 5 on identical straight line formed on each of the aforementioned head arms 4.

The shaft section 16 of the screwdriver 15 is inserted toward into the tapped hole 5 of the head arm 4A through the other side tapped hole 5 of the head arm 4B. The through-holes 10 on arm mounting section 9 of the head assembly 6 are arranged in correspondence to the tapped holes 5 of head arm 4B on the other side. Then, the thread section 14 of thread member 11 shall be arranged toward the tapped holes 5 on head arms 4 from the through-holes 10 on arm mounting section 9, the joint section 17 of screwdriver 15 shall be applied to the joint groove 12 at a head section 13 of the thread member 11, and the screwdriver 15 shall be turned to join the thread member 11. Thereby, the head assembly 6 can be connected to the head arms 4.

Next, the through-holes 10 on the arm mounting section 9 of the head assembly 6 shall be arranged in correspondence to the tapped holes 5 on head arms 4 adjacent to the head arms 4 to which this head assembly 6 is locked with screws, and they shall be locked by use of screws in the same way as the assembling method mentioned above. And the head assembly 6 shall sequentially be connected with screws onto the head arms 4 toward the head arms 4B on one side from the head arms 4A on the other side.

Therefore, this embodiment provides a simple structure and the positional deviation of magnetic head attributable to environmental changes like temperature fluctuation can also be prevented effectively because this employs such a structure that the head assembly 6 is connected by use of screws onto these head arms 4 where a plurality of head arms 4 are formed integrally onto the arm supporting block 1. In addition, the cost can be decreased because the required number of parts is curtailed down and their assembling work is simplified.

Next, the assembling unit and the assembling method of the actuator mechanism suitable for assembling the actuator mechanism shown in FIG. 1 will be described.

Figure 5:
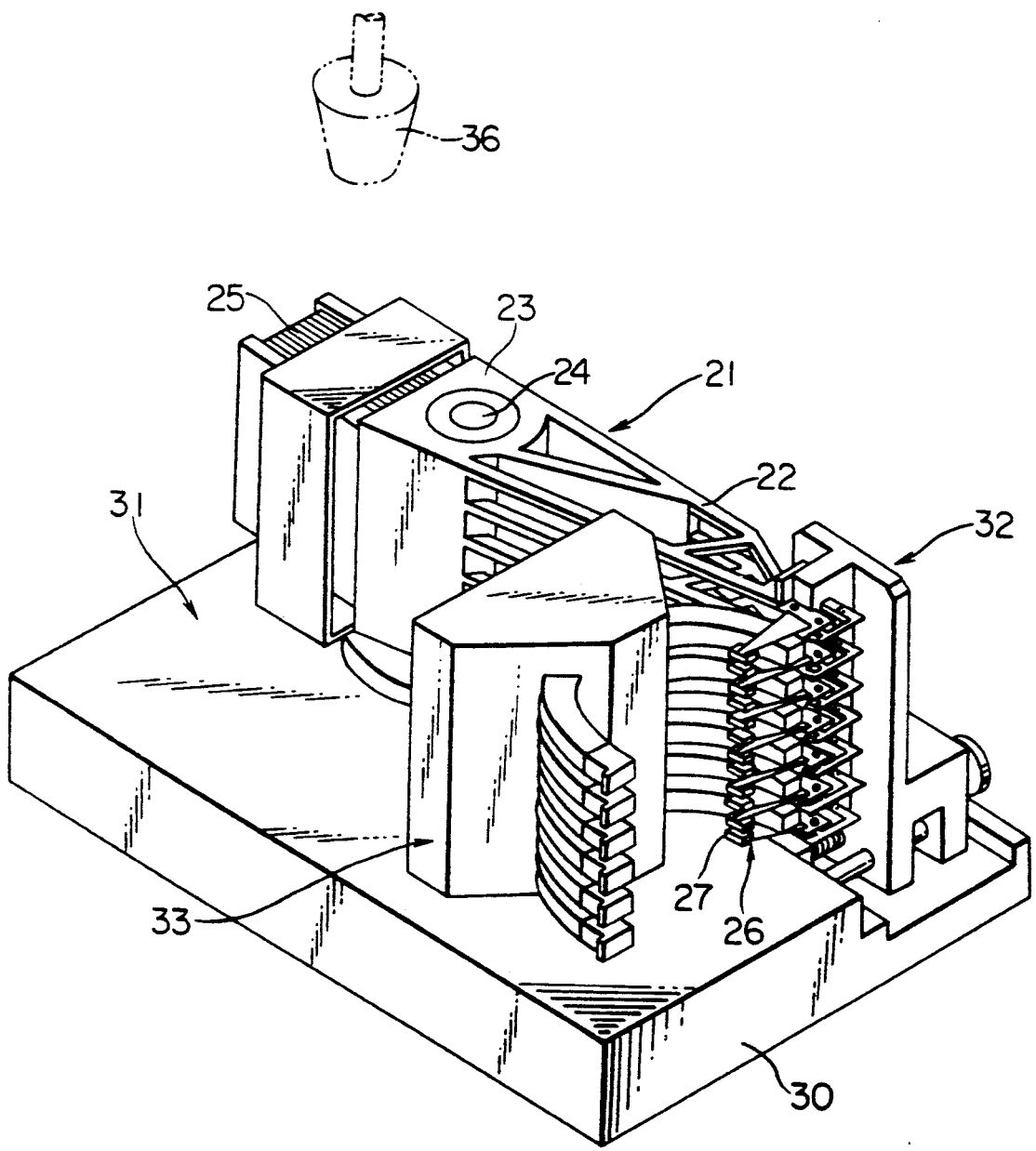
FIG. 5 is a perspective view for explaining the assembling unit used for assembling the actuator mechanism of FIG. 1.
Figure 6:
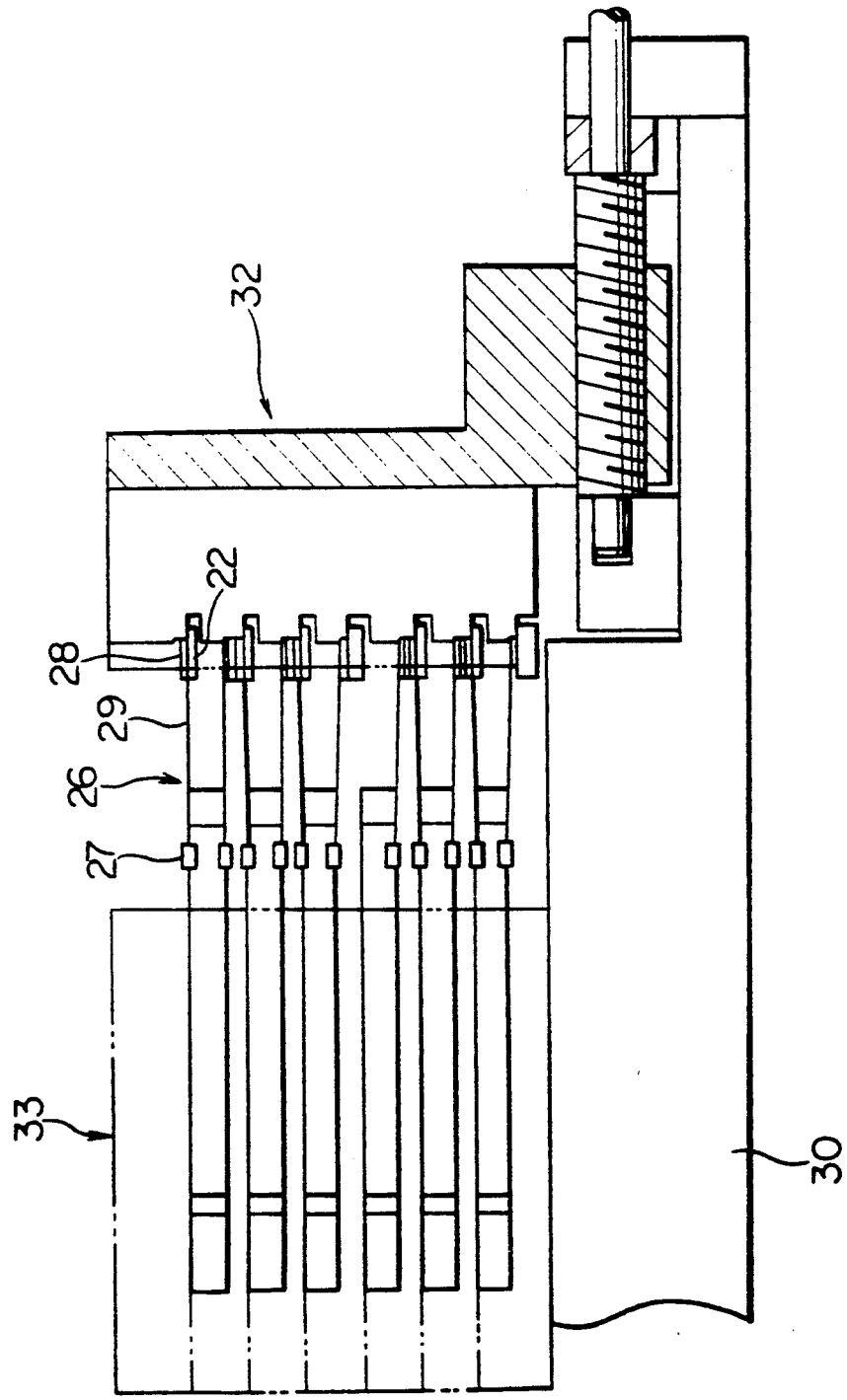
FIG. 6 is a partial sectional side view of FIG. 5.
Figure 7:
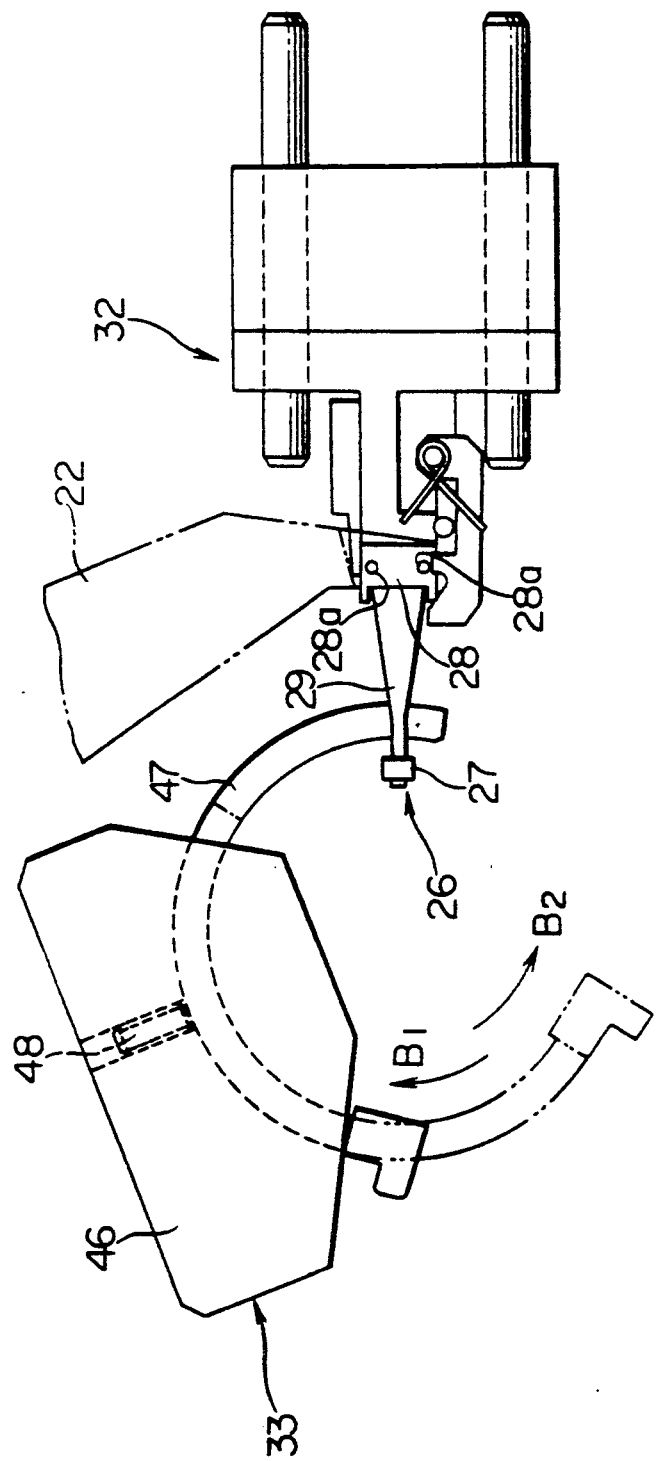
FIG. 7 is a plan view of FIG. 5.

FIG. 5 is a perspective view for explaining the assembling unit suitable for assembling the actuator mechanism of the magnetic disk apparatus shown in FIG. 1, FIG. 6 is a side view omitting part of FIG. 5, and FIG. 7 is a plane view omitting the part of FIG. 5.

In these figures, numeral 21 designates the actuator main body. This actuator main body 21 is made, for example, of die-cast molding, wherein a plurality of head arms 22 are unified into the arm supporting block 23. The arm supporting block 23 is installed rotatably to the shaft 24 of the actuator stand (not shown), and a voice coil 25 is formed on the arm supporting block 23, while this voice coil 25 is constructed in the way that it is arranged between a magnet (not shown) and a yoke (not shown) which are provided on the actuator base. And numeral 26 indicates the head assembly to be fitted to the head arms 22, and the head assembly 26 includes the magnetic heads 27 for writing in and reading out the data for the magnetic disk not shown in the figure and the suspension 29 having the mounting section 28 where the magnetic head 27 is fitted to one end portion and the through-holes 28a are formed on the other end portion.

Further, numeral 30 is the base which incorporates thereon the actuator main body positioning mechanism 31 for positioning the head arms 22 of actuator main body 21, the head assembly positioning mechanism 32 for energizing and positioning the mounting section 28 of head assembly 26 in a given direction when mounting the head assembly 26 onto the tip of head arms 22, and the head separating mechanism 33 for spacing the respective magnetic heads 27 of head assembly 26 from each other when the head assembly 26 has been fixed to the head arms 22.

Next, the actuator main body positioning mechanism 31 will be described in detail.

Figure 8:
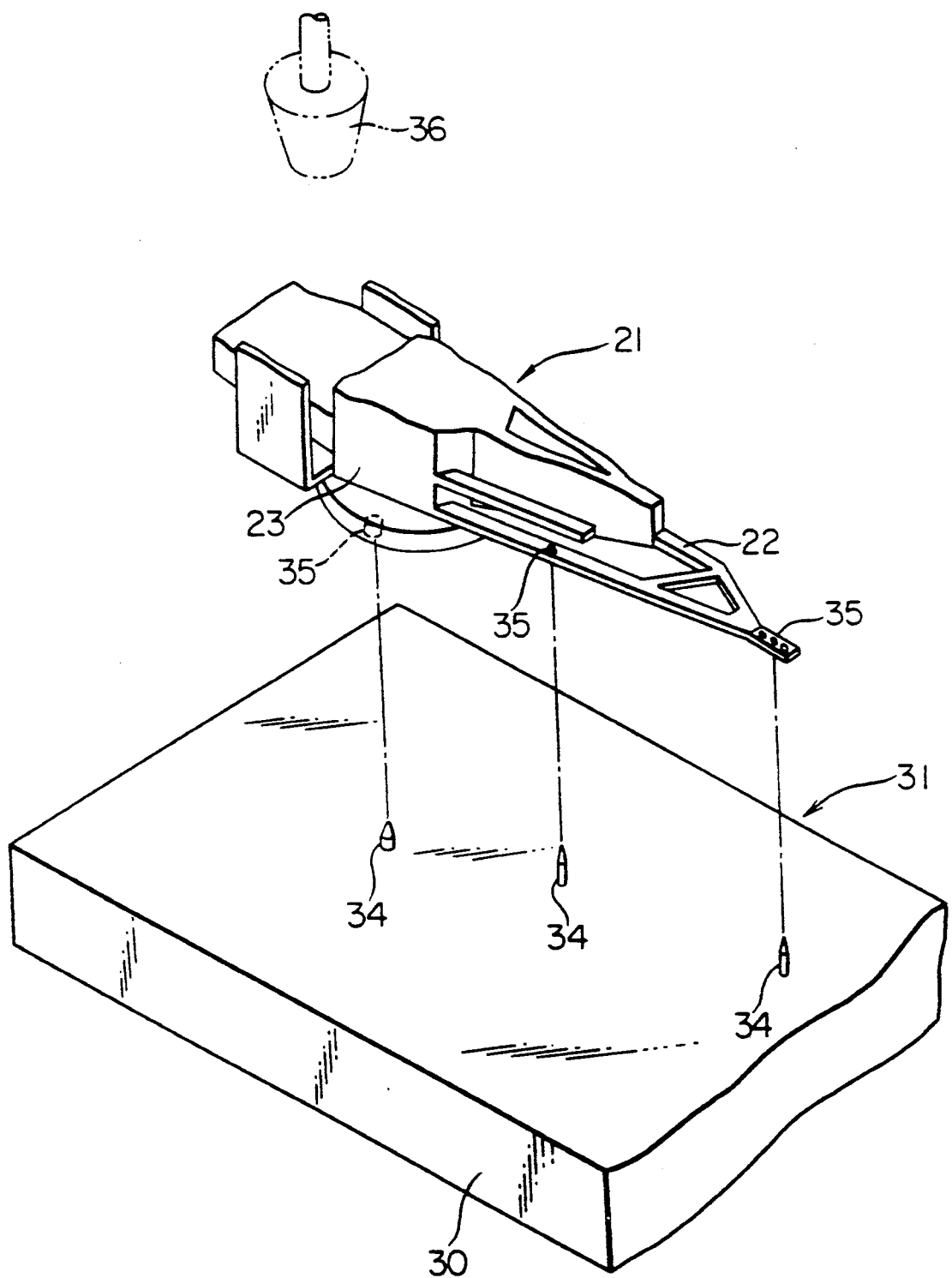
FIG. 8 is a perspective view for explaining the actuator main body positioning mechanism.

FIG. 8 is a perspective view for explaining the actuator main body positioning mechanism 31.

As shown in the figure, a plurality of protrusions 34, are formed at given places on the base 30. These protrusions 34 are joined to the positioning concave grooves 35 formed respectively to the actuator main body 21, and the actuator main body 21 is to be pressed against the base and retained thereon by use of a pressing mechanism 36 after the body has been positioned by the protrusion 34.

Next, the head assembly positioning mechanism 32 will be explained in detail.

Figure 9:
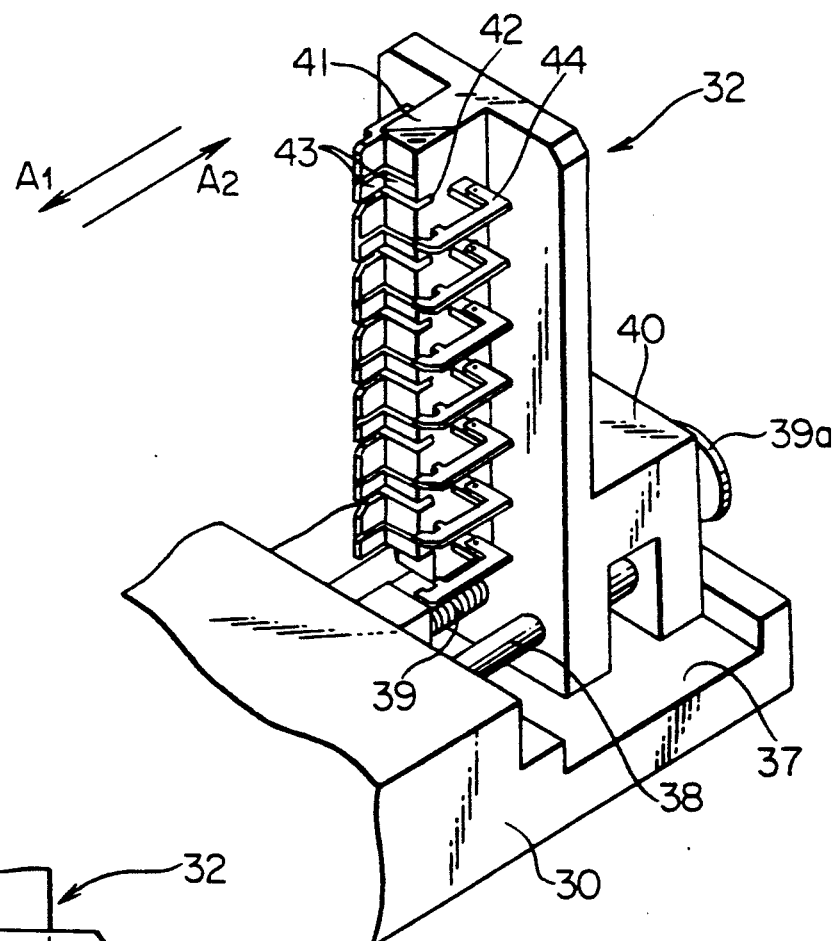
FIG. 9 is a perspective view for explaining the head assembly positioning mechanism.
Figure 10:
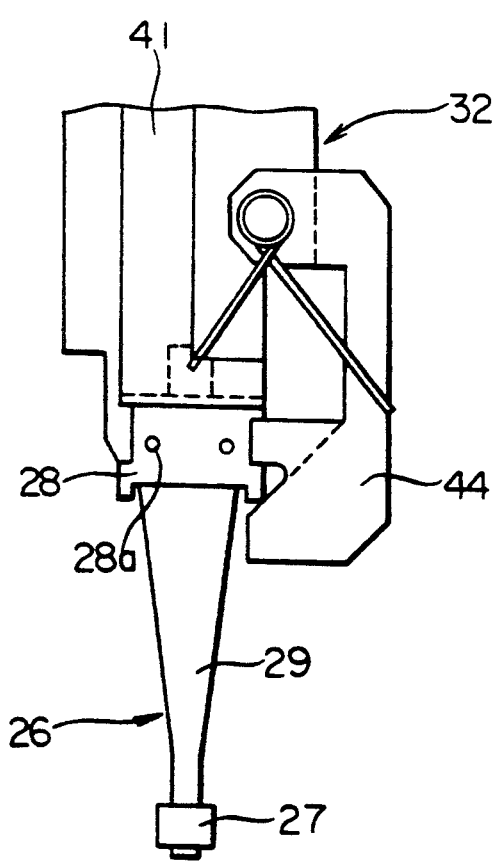
FIG. 10 is a plane view of FIG. 9.
Figure 11:
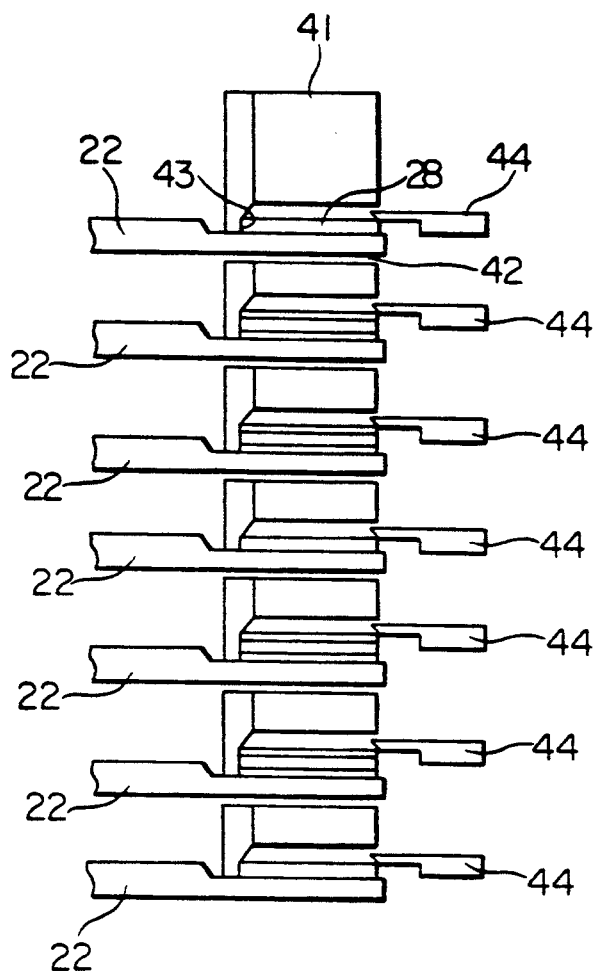
FIG. 11 is a partial sectional front view showing the majour portion of FIG. 9.
Figure 12:
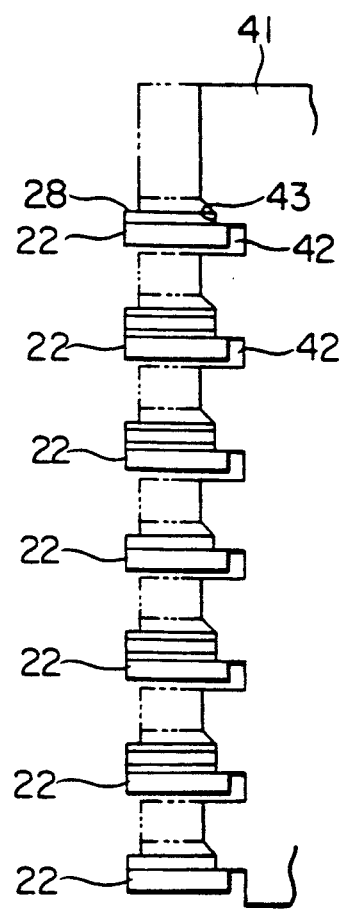
FIG. 12 is a side sectional view of FIG. 9.

FIG. 9 is a perspective view for explaining the head assembly positioning mechanism 32, FIG. 10 a plan view of FIG. 9, FIG. 11 a partial sectional front view showing the main part of FIG. 9, and FIG. 12 a side sectional view of FIG. 11.

As shown in the figures, the concave section 37 is formed on the base 30, and the guide shafts 38 and 38 as well as the multi-thread screw 39 are arranged on this concave section 37. The guide shafts 38 as well as the multi-thread screw 39 are passed through and screwed into the head positioning block 40 so that the head positioning block 40 can be moved in the direction of arrows $A_1$ and $A_2$ by turning the handle section 39a of the multi-thread screw 39. The positioning strip 41 is formed on the head positioning block 40, and to this positioning strip 41 the notch sections 42, 42 . . . for passing through the tips of respective head arms 22 in correspondence to these head arms. In addition, the mounting face 43 for positioning the mounting section 28 of the head assembly 26 is formed onto the positioning strip 41. The pressing arm 44 for pressing the mounting section 28 of head assembly 26 toward the aforementioned positioning face 43 is arranged to the positioning strip 41, and the pressing arm 44 is pressed against the spring 45.

Figure 13:
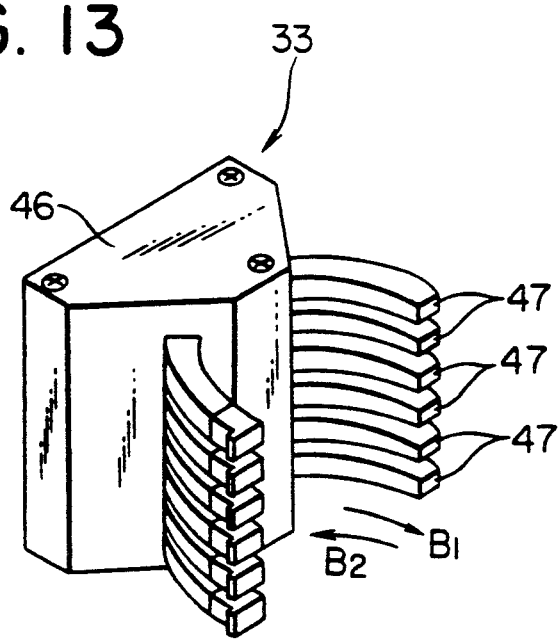
FIG. 13 is a perspective view showing the head separating mechanism.

Next, the head separating mechanism 33 will be explained in detail by way of FIG. 7 and FIG. 13.

As shown in these figures, the head separating mechanism 33 is structured of the spacer support block 46 and the C-letter shaped spacer rings 47 which are arranged for free movement in the direction of arrows $B_1$ and $B_2$ into the spacer support block 46. The spacer rings 47 can be stopped at an optional position by the spring plunger 48 arranged inside the spacer support block 46. Each spacer ring 47 is moved in arrow $B_1$ direction so as to separate the magnetic heads 27 (so that the magnetic heads will not contact each other) when the head assembly 26 is fixed to the head arms 22.

Then, the method for assembling the actuator mechanism of the magnetic disk apparatus of the present invention will be explained.

First, the concave grooves 35 of actuator main body 21 are joined, for positioning, to the protrusions 34, 34 and 34 on the base 30 which structures the actuator mechanism 31 thereon, and shall be pressed against the base by the pressing mechanism 36, for its retention thereon. Next, the handle section 39a of head assembly positioning mechanism 32 is manipulated to move the head positioning block 40 up to the given position in arrow $A_1$ direction (which is the position where the through-hole [not shown] of the mounting section 28 of the head assembly 26 has coincided with the tapped hole [not shown] provided on the head arm 22).

Thereafter, the mounting section 28 of head assembly 26 shall be arranged to the tip of head arms 22 on the side of base 30 (lower side), and the positioning shall be made by pressing the mounting section 28 toward the positioning face 43 of the positioning strip 41 formed on the head positioning block 40 by means of the energizing arm 44 which is provided on the head assembly positioning mechanism 32.

Figure 14:
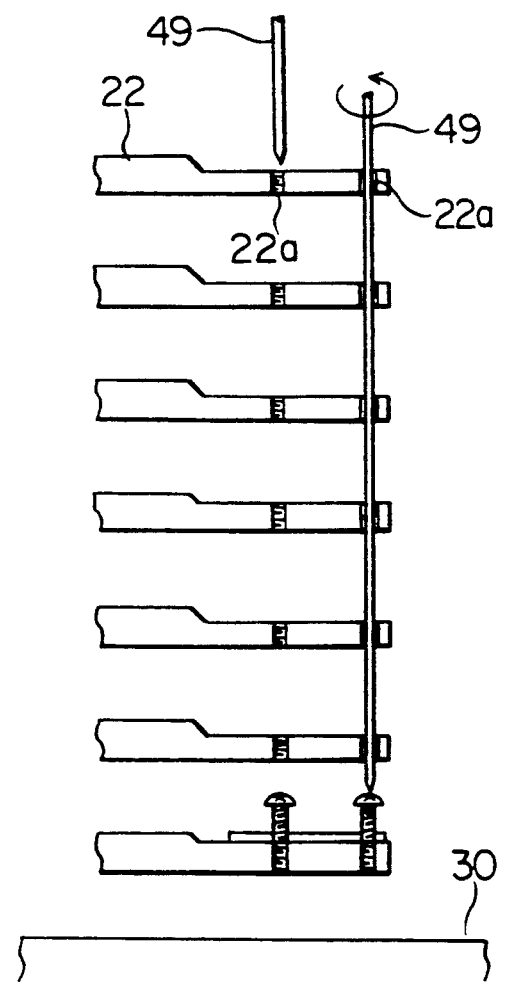
FIG. 14 is a side sectional view for explaining the screw tightening tool and assembling method.
Figure 15:
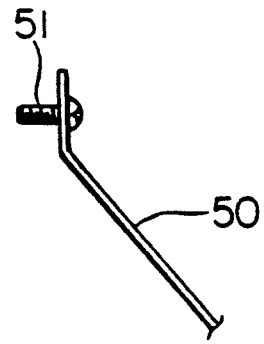
FIG. 15 is a side view showing the screw supplying
Figure 16:
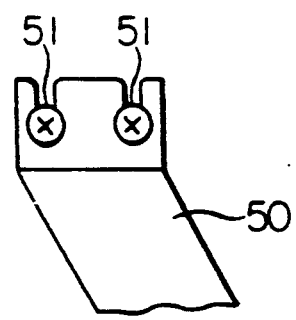
FIG. 16 is a plane view of FIG. 15.
Figure 17:
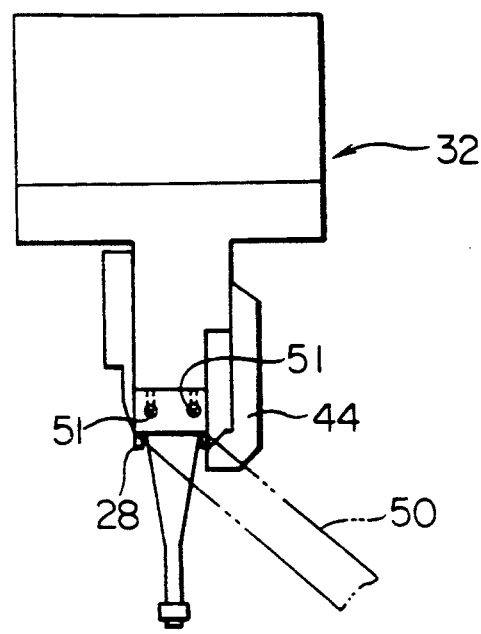
FIG. 17 is a plane view for explaining the screw supplying tool and assembling method.
Figure 18:
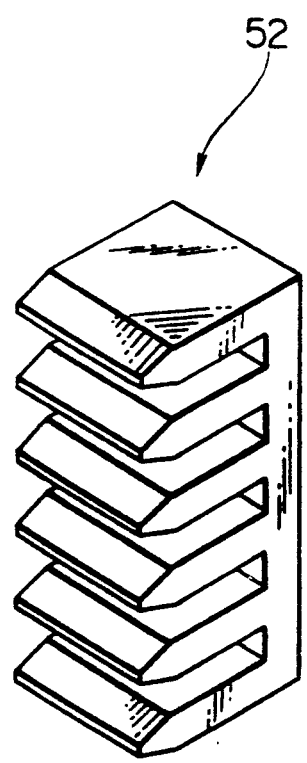
FIG. 18 is a perspective view for explaining the spacer for separating the heads.

Then, as shown in FIG. 14, the screw tightening tool 49 passing through the tapped hole 22a of the head arm 22 shall be inserted toward the tapped holes of head arms 22 on lower side (on the side of base 30) from the tapped holes of head arms 22 on upper side. Next, as shown in FIG. 15 through FIG. 17, the screws 51 and 51 shall be fitted to the screw supplying tool 50 which shall then be arranged to the through-hole (not shown) of the mounting section 28 on the head assembly 26 positioned as mentioned above, and the screws 51 and 51 shall be clamped and fixed to a given clamp force by use of the screw tightening tool 49. Thereafter, the spacer ring 47 on lower side on head separating mechanism 33 shall be moved toward arrow $B_1$ direction to push down the suspension 29 of the head assembly 26. Then, respective head assemblies 26 shall sequentially be fitted to the tip of respective head arms 22 in a similar way to the aforementioned assembling work. And, when the work for connecting each head assembly 26 to each head arm 22 is done, the comb-shaped spacer 52 in its cross section which is shown in FIG. 18 shall be inserted into the position of the head separating spacer ring 47 arranged between suspensions 29 of each head assembly 26, while detaching the spacer ring 47, to separate respective magnetic heads 27 from each other. After this, the head positioning block 40 of the head assembly positioning mechanism 32 shall be moved toward arrow $A_2$ direction by controlling the handle section 39a, and further the pressing mechanism 36 of actuation main body positioning mechanism 31 shall be released to remove the actuator main body 21 out of the base 30.

Therefore, because this embodiment not only uses the actuator main body 21 in which a plurality of head arms 22 are formed integrally onto the arm support block 23 but also assembles by the above mentioned assembling method and assembling unit the head assembly 26 to the tip of respective head arms 22 of the actuator main body 21, the displacement of magnetic head can be prevented effectively and still more it is possible to attempt enhancing the assembling efficiency and reducing the cost, or protect the head effectively at time of assembly work.

Figure 19:
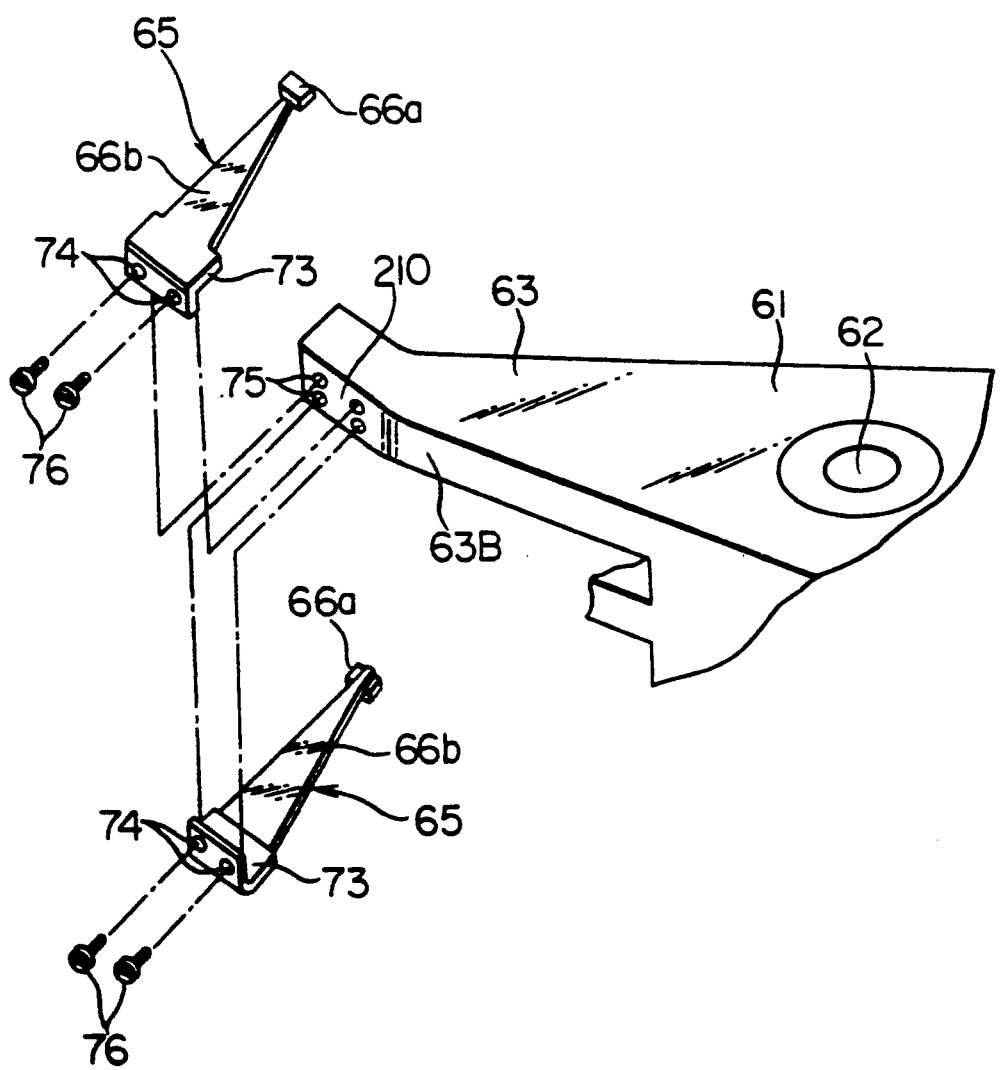
FIG. 19 is a disassembled perspective view for explaining the actuator mechanism as the 2nd embodiment of the present invention.

FIG. 19 is a disassembled perspective view enlarging the main part shown as the 2nd embodiment of the present invention.

As shown in this figure, in the present embodiment, the magnetic head 66a is fitted to one end of suspension 66b of the head assembly 65 and the L-letter shaped mounting plate 73 is provided integrally to the other end, and the tapped through-holes 74 and 74 are formed on the mounting plate 73. In addition, to the side face 63B of the head arm 63 perpendicular to the rotary face of the head arm 63, the assembly supporting means 210 is provided. And in this assembly supporting means 210, the tapped holes 75 and 75 in correspondence to the through-holes 74 and 74 of aforementioned mounting plate 73 are formed in parallel with the rotary face of the head arm 63. The through-holes 74 and 74 of mounting plate 73 of the suspension 66b shall be arranged in correspondence to the tapped holes 75 and 75 on side face 63B of each head arm 63 so that the head assembly 65 may be approximately in right angle with the head arm 63, and the head assembly 65 is fixed to the head arm 63 by screwing in the lock screws 76.

Figure 20:
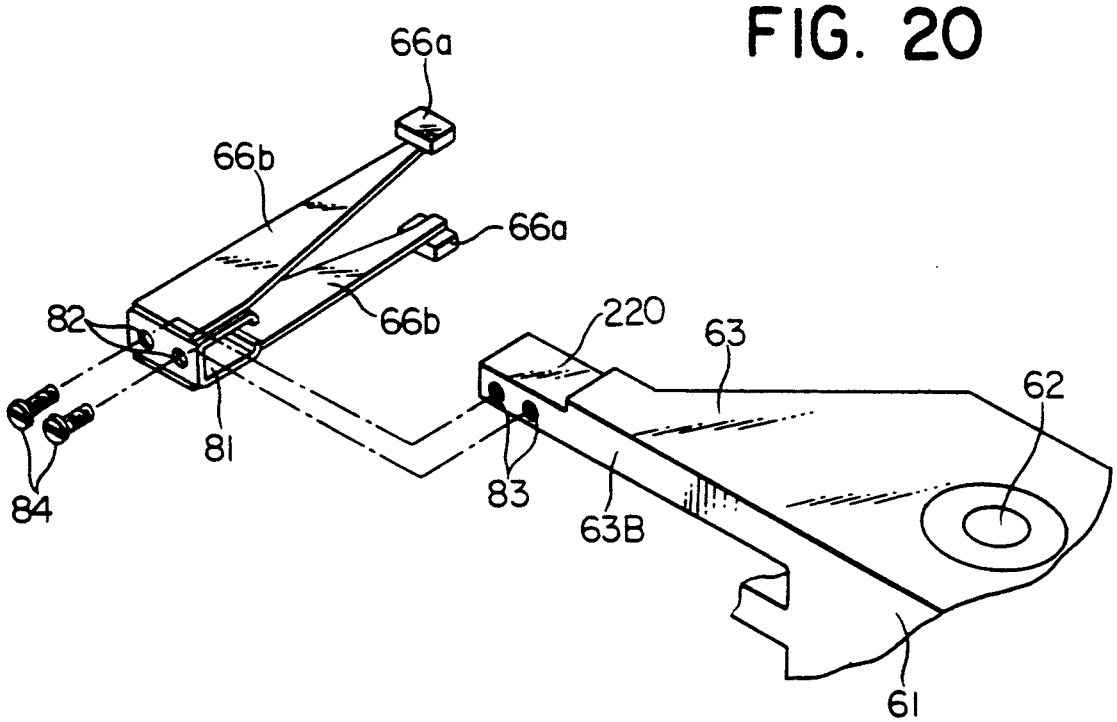
FIG. 20 is a disassembled perspective view for explaining the actuator mechanism as the 3rd embodiment of the present invention.

FIG. 20 is a disassembled perspective view enlarging the main part showing the 3rd embodiment of the present invention, and the identical numerals are given to the parts in common to FIG. 19 to avoid an overlapped explanation.

In this figure, a pair of suspensions 66b, to which the magnetic heads 66a are respectively fitted, are provided integrally to the mounting member 81 formed to an approximately to a U-shape by, for example, a spot welding in this embodiment for their formation into the head assembly 65. The U-shaped mounting member 81 and the assembly supporting means 220 provided on the tip of head arm 63 are formed to the size for their fitting to each other, and the through-holes 82 and 82 are provided to the mounting member 81. Further, to the side face 63B perpendicular to the rotary face of the head arm 63, the tapped holes 83 and 83 in correspondence to the through-holes 82 and 82 of the above mentioned mounting member 81 are formed in parallel with the rotary face of the head arm 63.

The U-shaped mounting member 81 of head assembly 65 shall be inserted to the tip of head arm 63 and the through-holes 82 and 82 of mounting member 81 shall be positioned in correspondence to the tapped holes 83 and 83 on side face 63B of head arm 63, thus the head assembly 65 is fixed to the head arm 63 by screwing the lock screws 84 and 84 into the tapped holes 83 from the through-holes 82.

Figure 21:
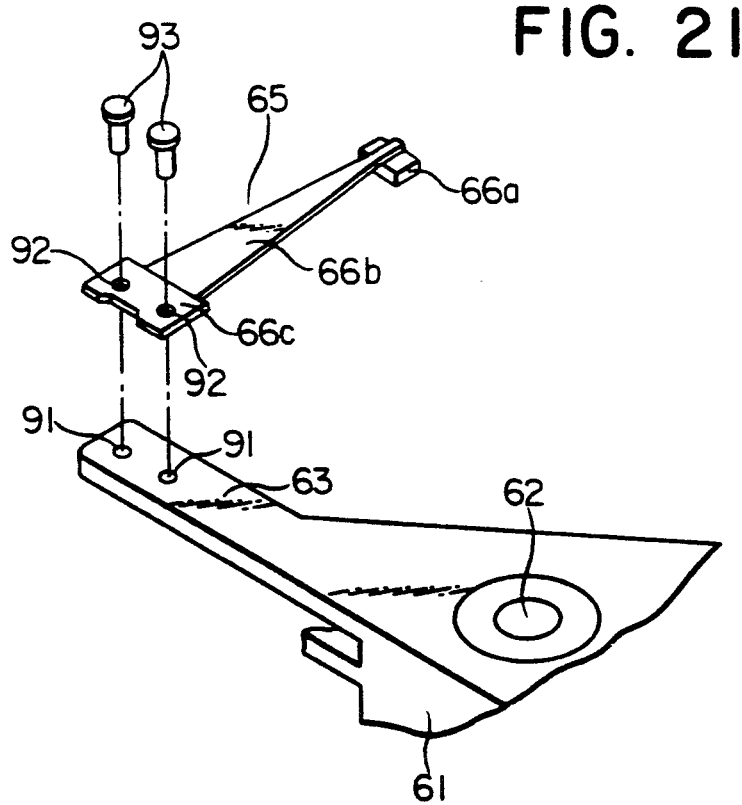
FIG. 21 is a disassembled perspective view for explaining the actuator mechanism as the 4th embodiment of the present invention.

FIG. 21 is a disassembled perspective view of main part showing the 4th embodiment of the present invention, FIG. 22 and FIG. 23 are side sectional views for explaining the assembled state. In these figures, the same numerals are given to the parts in common with those in FIG. 19 and FIG. 20 for omission of an overlapped explanation.

As shown in these figures, in the present embodiment, the rivet through-holes 91 and 91 are formed at the tip of the head arm 63. Further, the head assembly 65 includes the suspension 66b fitted with magnetic head 66a and the arm mounting section 66c installed suspension 66b, while the fitting holes 92 and 92 meeting the above mentioned rivet through-holes 91 are provided on the arm mounting section 66c. Numeral 93 designates the rivet made of thermoplastic resin, and is formed to a hollow or a solid structure.

As shown in FIG. 22 and FIG. 23, the fitting holes 92 formed in the arm mounting section 66c of head assembly 65 are arranged in correspondence to the rivet through-holes 91 and 91 of head arm 63, wherein the rivets 93 and 93 are inserted into the rivet through-holes 91 from the fitting holes 92 and the tip of the rivets 93 is heated up and caulked as shown in FIG. 23. In this case, the fitting hole 92 and the rivet through-hole 93 are filled with the fused rivet 93. The heating means for the rivet is not limited to a particular type, and for example, a supersonic wave or a laser beam can be used. Moreover, the material for rivet 93 should preferably be the one with same thermal expansion coefficient as that for head arm 63.

FIG. 24 is a disassembled perspective view of main part showing the 5th embodiment of the present invention, FIG. 25 is a side sectional view for explaining the assembled state of FIG. 24. In these figures, the identical numerals are given to the parts in common with those in FIG. 19 through FIG. 23 for the sake of omission of an overlapped explanation. In addition, FIG. 24 is showing the embodiment in which the present invention is applied to the straight arm type carriage mechanism. The straight arm type carriage mechanism is disclosed in U.S. Pat. No. 4,620,251.

As shown in these figures, the assembly supporting means 230 is formed at the tip of head arm 63. And, bush through-holes 101 and 101 are formed in the assembly supporting means 230. Further, the head assembly 65 includes the magnetic head 66a, the suspension 66b fitted with the magnetic head 66a, and the arm mounting section 66c installed to suspension 66b, and the through-holes 102 and 102 meeting the above mentioned bush through-holes 101 are 103 designates the bushing which is structured of the flange 104 and the hollow shaft section 105. Also, numeral 106 is a lock screw which can be screwed into the hollow shaft section 105 of bush 103. Additionally, the bushing through-hole 101 of the head arm 63 has the size meeting the outside diameter of hollow shaft section 105 of the bush 103, while the through-hole 103 of arm mounting section 66c has the size meeting the outside diameter of lock screw 106.

As shown in FIG. 25, the head assembly 65 is fixed to the head arm 63 by arranging the through-holes 102 and 102 formed on arm mounting section 66c of the head assembly 65 in correspondence to the bush through-holes 101 on the head arm 63, inserting the hollow shaft section 105 of the bush 103 into the bush through-hole 101 toward the side of the head assembly 65 from the side of the head arm 63, and also inserting the lock screw 106 into the through-hole 102 toward the side of the head arm 63 from the side of the head assembly 65, and by screwing the thread portion of the lock screw 106 into the hollow shaft section 105 of the bush 103.

Figure 26:
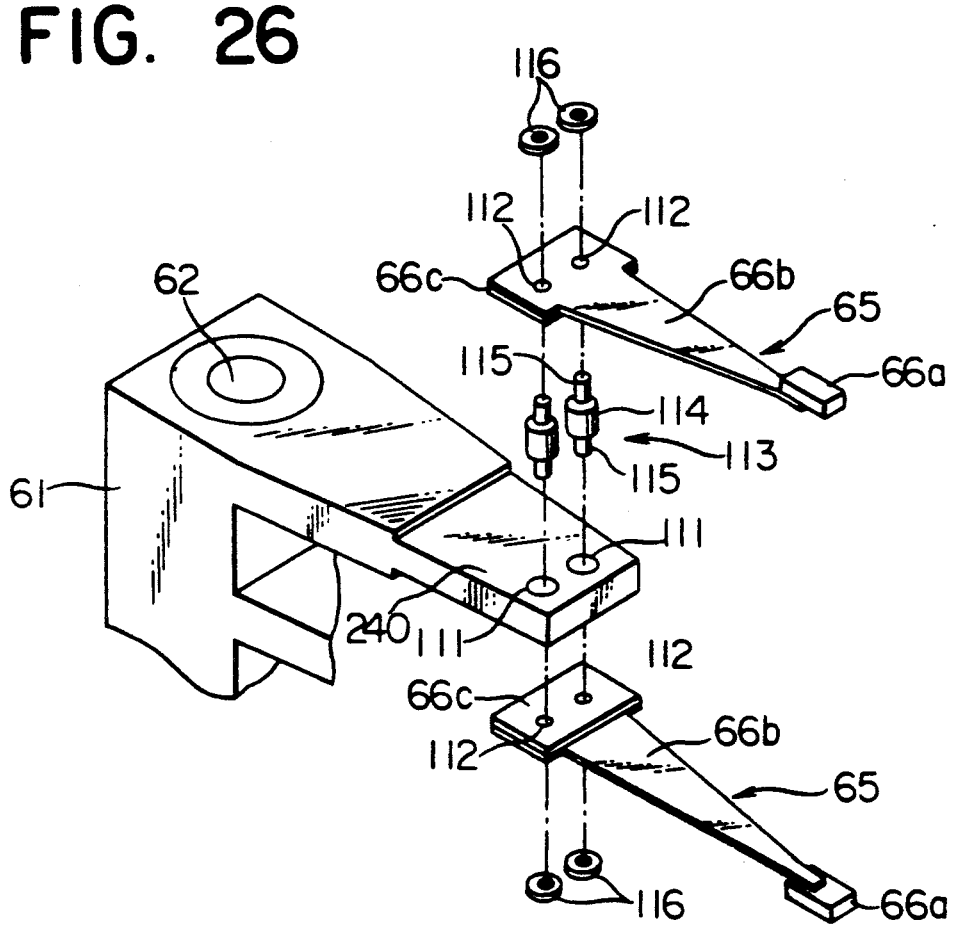
FIG. 26 is a disassembled perspective view for explaining the actuator mechanism as the 6th embodiment of the present invention.
Figure 27:
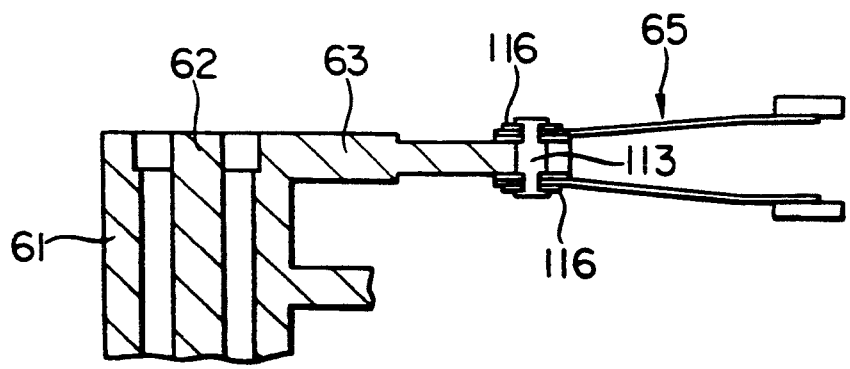
FIG. 27 is a side sectional view of FIG. 26.

FIG. 26 is a disassembled perspective view of the main part showing the 6th embodiment of the present invention, FIG. 27 is a side sectional view for explaining the assembled state of FIG. 26. In these figures, the same numerals are given to the parts in common with those in FIG. 19 through FIG. 25 for the sake of omitting an overlapped explanation.

As shown in these figures, in the present embodiment, the assembly supporting means 240 is installed at the tip of the head arm 63. The caulk pin through-holes 111 and 111 are formed in the assembly supporting means 240. Further, the head assembly 65 includes the magnetic head 66a, the suspension 66b fitted with magnetic head 66b, and fitting holes 112 and 112 meeting the above mentioned caulk pin through-holes 111 are formed on the arm mounting section 66c. Numeral 113 is the caulk pin which is structured of the larger diameter section 114 and the caulking sections 115 and 115 of smaller diameter formed on both the side of larger diameter section 114. Numeral 116 is the washer capable of inserting the caulk section 115 of the caulk pin 113. The caulk pin through-hole 111 of the head arm 63 has the dimension meeting the outside diameter of larger diameter section 114 of the caulk pin 113, whereas the fitting hole 112 of the arm mounting section 66c is measured to meet the outside diameter of caulk section 115.

As shown in FIG. 27, the larger diameter section 114 of the caulk pin 113 is inserted into the caulk pin through-hole 111 of the head arm 63 while the fitting holes 112 and 112 formed on the arm mounting section 66c of the head assembly 65 is inserted into the caulking section 115 of the caulk pin 113, and still more the washer 116 is inserted into the caulking section 115 from the above mentioned arm mounting section 66c. And when the caulking section 115 is caulked, the tip of caulking section 115 is expanded in Diameter, and the head assembly 65 is fixed to the head arm 63.

Figure 28:
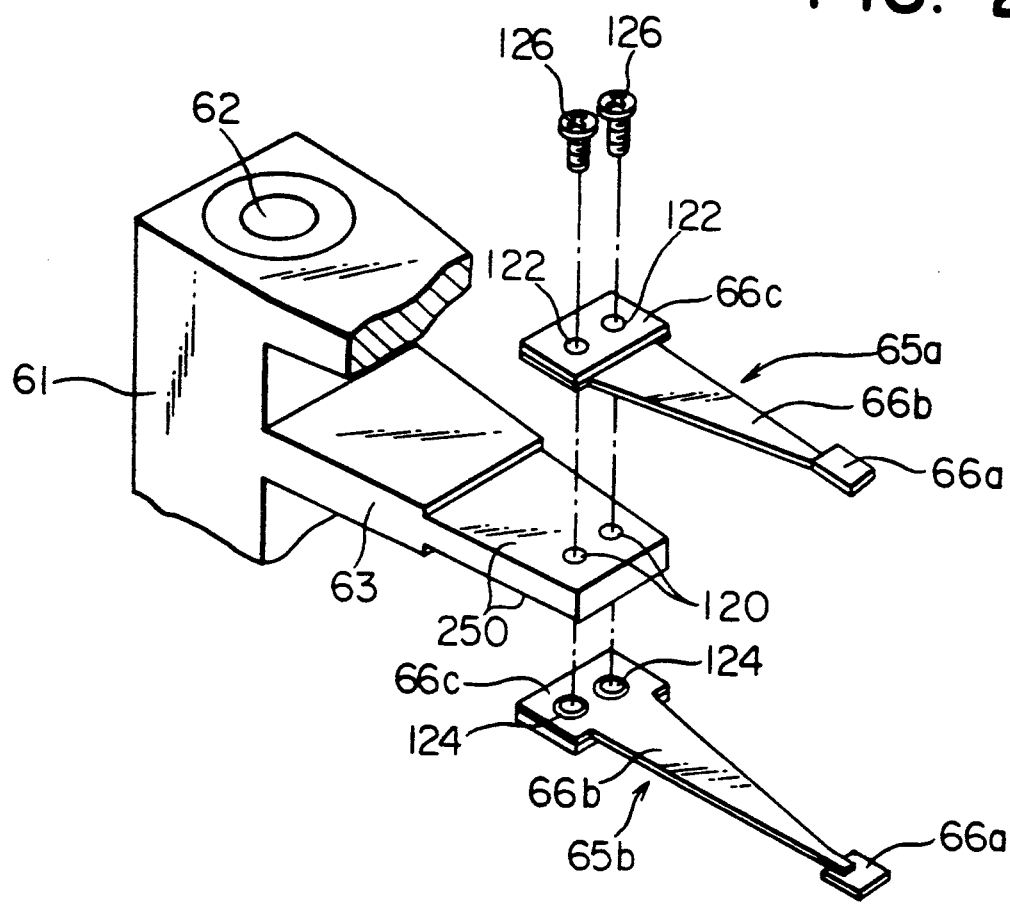
FIG. 28 is a disassembled perspective view for explaining the actuator mechanism as the 7th embodiment of the present invention.
Figure 29:
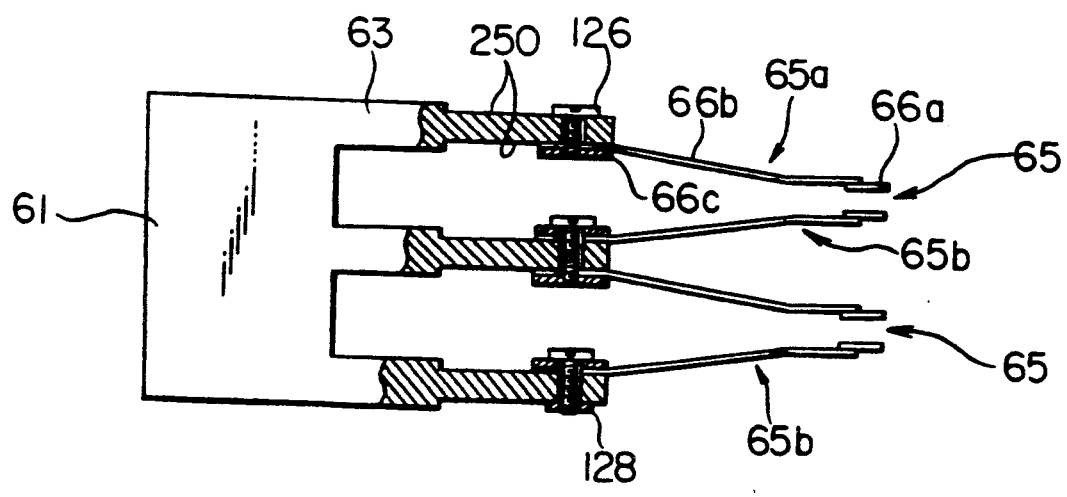
FIG. 29 is a partial side sectional view of FIG. 28.

FIG. 28 is a sectional perspective view showing the main part of the 7th embodiment of the present invention and FIG. 29 is a partial sectional side view of FIG. 28. In these figures, the same codes are given to the parts in common to those in FIG. 19 through FIG. 26 so that an overlapped explanation can be omitted.

As shown in these figures, in the present embodiment, the assembly supporting means 250 is installed to the tip of head arm 63, and the through-holes 120 and 120 penetrated across and on identical straight line to the rotary face of respective head arms 3 are built up on this supporting means 250.

The head assembly 65 is structured of up-head assembly 65a and down-head assembly 65b. Each head assembly 65a and 65b includes the magnetic head 66a for writing in and reading out data respectively for the magnetic disk (not shown), the head suspension 66b to which the magnetic head 66a is fitted, and the arm mounting section 66c installed on the head suspension 66b. The fitting holes 122 in correspondence to the through-holes 120 of head arms 63 are formed on the arm mounting section 66c of the up-head assembly 65a, whereas, for example, the tapped holes 124 provided by tapping work are formed in correspondence to the through-holes 120 of the head arms 63 on the arm mounting section 66c of the down-head assembly.

And the up-head assembly 65a is arranged on the upper side of the head arms 63, and the down-head assembly 65b is arranged on the lower side of the head arms 63 so that the screws 126 may be penetrated into the through-holes 120 of the head arms 63 from the fitting holes 122 formed on the arm mounting section 66c of up-head assembly and screwed into the tapped holes 124 formed on the arm mounting section 66c of the down head assembly 65b. Thereby, respective head assemblies 65a and 65b are mounted to the head arms 63. For reference, if the up-head assembly 65a alone should be mounted to the head arms 63, the plate nuts 128 shall be arranged to the lower side of head arms 63 and the screws 126 shall be screwed into the plate nuts 128.

Next, the assembling the actuator mechanism of the magnetic disk apparatus will be explained in detail.

First, the head arms 63 shall be arranged to the lowest side of the arm supporting block 61 and the plate nuts 128 shall be arranged to the upper side thereof. Then the screws 126 shall be arranged to the arm mounting section 66c side of the up-head assembly 65a and shall be screwed into the plate nuts 128 by turning the screwdriver which is not shown in the figure, which can be penetrated into the fitting holes 122, through-holes 120 and tapped holes 124. Thereby, the up-head assembly 65a can be fixed to the head arms 63 on the lowest side.

Next, the up-head assembly and the down-head assembly shall be arranged respectively to the upper side and the lower side of head arms 63 adjacent to the head arms 63 (in the middle stage) locking the up-head assembly 65a with screws, and they shall then be screwed into and fixed to the tapped holes 124 of arm mounting section 66c with a screwdriver (not shown) in the same assembling method as mentioned above by inserting and arranging the screws 126 into the fitting holes 124 of the arm mounting section 66c and the through-holes of the head arms 63. Therefore, respective head assemblies 65a and 65b shall be locked to the head arms 63 with screws sequentially toward the upper side head arms 63 from the lower side head arms 63 of the arm supporting block 61.

Figure 30:
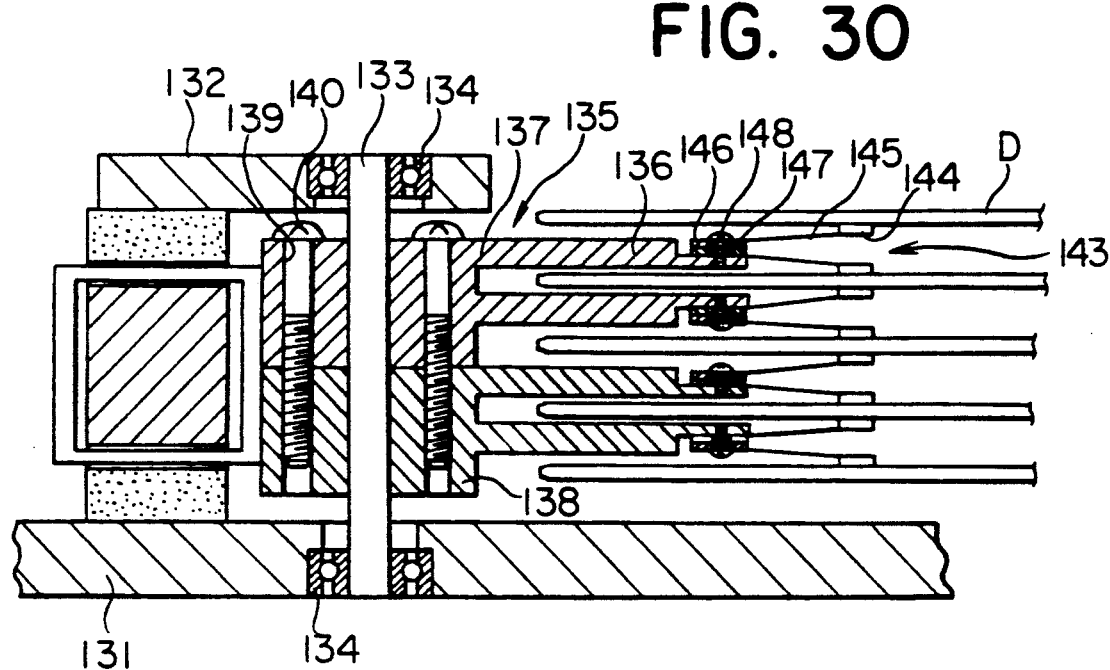
FIG. 30 is a side sectional view for explaining the actuator mechanism as the 8th embodiment of the present invention.

FIG. 30 is a side sectional view showing the 8th embodiment of the present invention.

According to this embodiment in this figure, the actuator fitting stand 132 is installed on the base 131, and the shaft 133 is arranged rotatably between the base 131 and the actuator fitting stand 132 through bearings 134 and 134. The actuator main body 135 is fitted to this shaft 133. This actuator main body 135 is structured by fitting and laminating to the shaft 133 the arm supporting blocks 137 and 138 on which two head arms 136 are integrally formed, inserting the lock screws 140 into the through-holes 139 formed on the arm supporting block 137 and screwing the lock screws 140 into the tapped holes 141 formed on the arm supporting block 138. The assembly supporting means 260 are installed to the tips of head arms 136 of respective arm supporting blocks 137 and 138. The tapped holes 142 are formed on the supporting means 260. The head assembly 143 includes the magnetic head 144 for writing in and reading out data respectively for the magnetic disk D, the head suspension 145 equipped with magnetic head 144 and the arm mounting section 146 formed on head suspension 145, and the fitting holes 147 in correspondence to the tapped holes 142 of the head arm 136 are formed on the arm mounting section 146 of the head assembly 143.

And to the head arms 136, the arm mounting section 146 of the head assembly 143 is arranged respectively on both the external sides (upper and lower sides) of the arm supporting blocks 137 and 138, the screws 148 are inserted from the fitting hole 147 side of the arm mounting section 146, and respective head assemblies 143 are fitted to the head arms 136 by screwing the screws 148 into the tapped holes 142 of the head arm 136.

Next, a detailed explanation is given to assembling the actuator mechanism of the magnetic disk apparatus.

Figure 31:
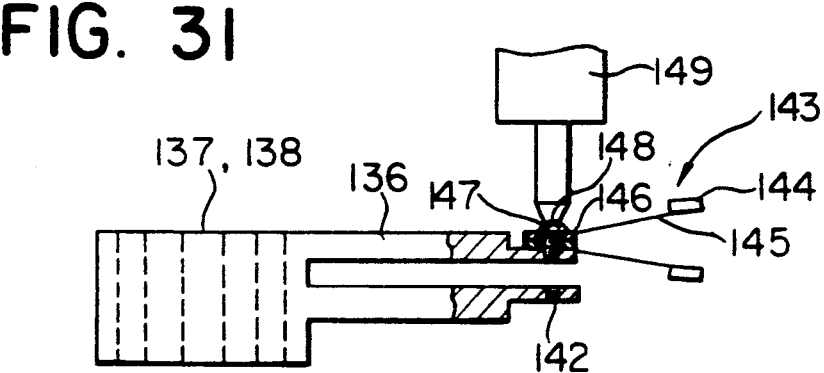
FIGS. 31 and 32 are partial side sectional view for explaining the assembled state of FIG. 30.

First, as shown in FIG. 31, the arm mounting section 146 of the head assembly 143 shall be arranged on the upper side head arms 136 of respective arm supporting blocks 137 and 138 while having the tapped holes 142 of the head arms 136 corresponded to the fitting holes 147 of arm mounting section 146. Then screw the screws 148 into the tapped holes 142 of head arms 138 using a screwdriver 149.

Figure 32:
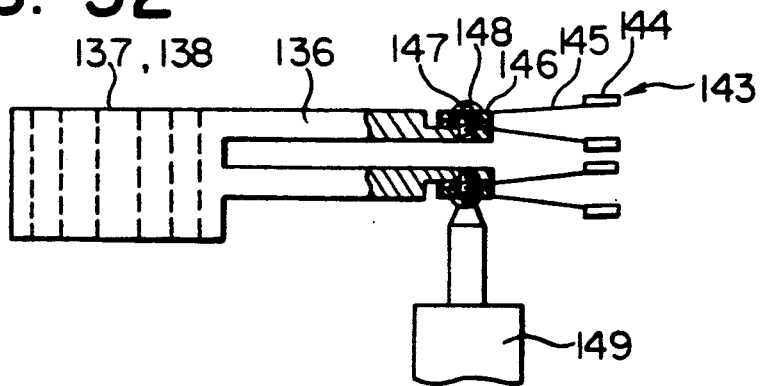

Then, as shown in FIG. 32, the arm mounting section 146 of the head assembly 143 shall be arranged on the lower side of lower side head arms 138 of respective arm supporting blocks 137 and 138 while having the tapped holes 142 of head arms 136 corresponded to the fitting holes 142 of head arms 136 corresponded to the fitting holes 147 of arm mounting section 146. And the screws 148 shall be screwed into the tapped holes 142 of head arms 136 by means of the screwdriver 149.

After this, the actuator main body 135 is assembled by fitting the arm supporting blocks 137 and 138, in which the head assembly 143 is locked to the head arms 136, to the shaft 133 with the arm supporting block 138 being arranged on lower side, by inserting the lock screws 140 into the through-holes 139 of upper arm mounting section 137 and screwing the lock screws 140 into the tapped holes 141 of lower side arm supporting block 138.

Figure 33:
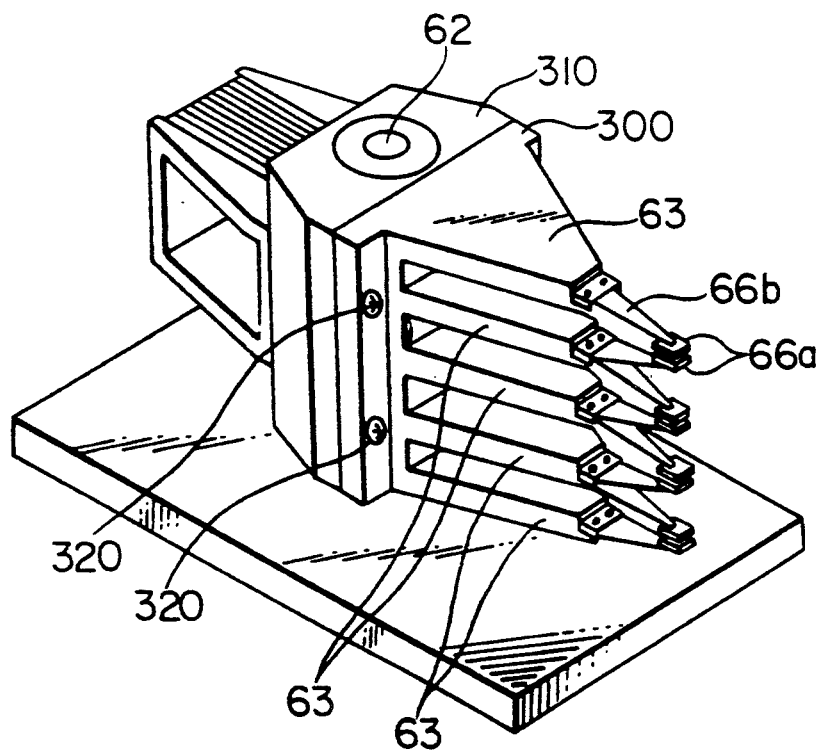
FIG. 33 is a perspective view for explaining the actuator mechanism as the 9th embodiment of the present invention.

FIG. 33 is a perspective view of the actuator mechanism showing the 9th embodiment of the present invention. For reference, in this Figure, the identical numerals are given to the parts in common with those in FIG. 19 through FIG. 26, so as to omit an overlapped explanation.

In this embodiment, a plurality of arms 63 are connected integrally to each other, and the carriage 300 and the block 310 arranged rotatably on the shaft 62 are constructed separately. The carriage 300 is coupled with the block 310 by use of screws 310. Even in this embodiment, the arms 63 are formed integrally to each other. Consequently, the same effect as that being provided by other embodiments can be obtained.

Figure 34:
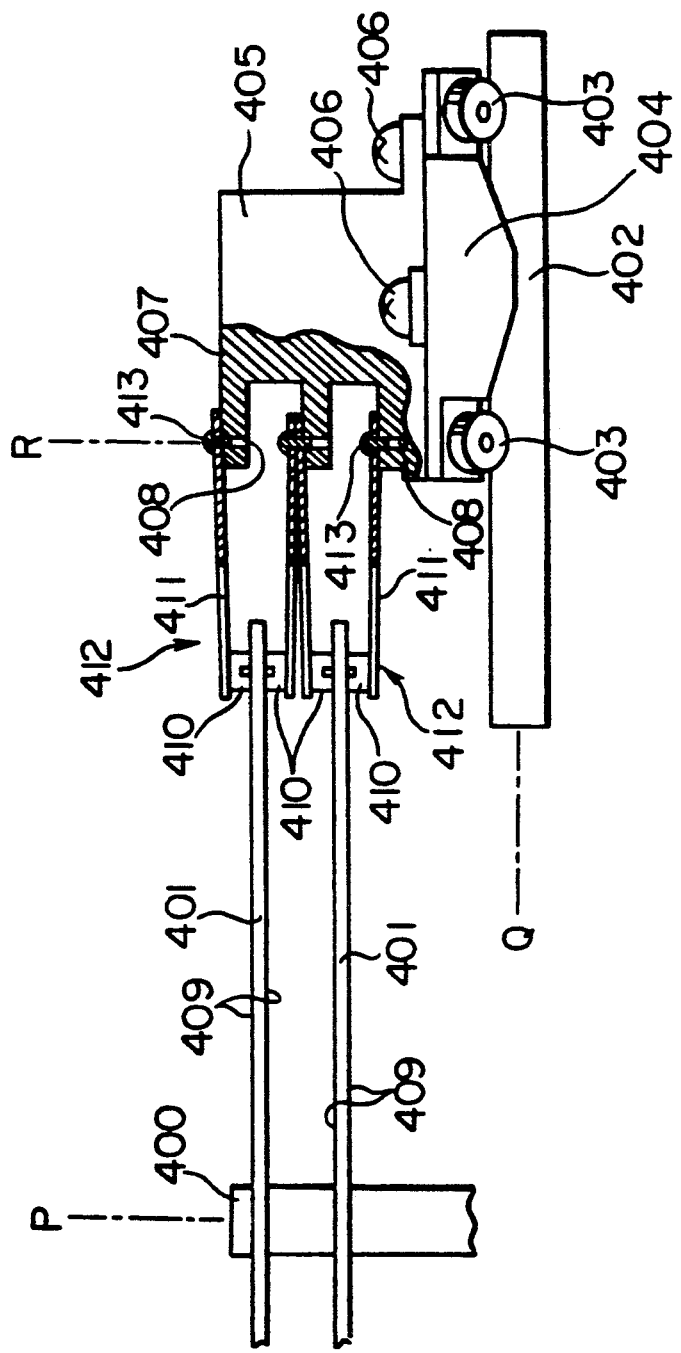
FIG. 34 is a partial side sectional view for explaining the actuator mechanism as the 10th embodiment of the present invention.

FIG. 34 is a partial sectional side view for explaining the 10th embodiment of the present invention, and stands for the embodiment in the case that the present invention is applied to the magnetic disk having a linear type actuator mechanism.

The two magnetic disks 401 are stacked concentrically to the rotary shaft 400. Cylindrical rails 402 are installed in the direction crossing in right angle the axial direction P of rotary shaft 400. A moving section 404 is installed on the rails 402 via the bearings 403. The moving section 404 moves on the rails 402 by the drive mechanism which is not shown in the figure. The carriage 405 is installed on the moving section 404. The carriage 405 is fixed onto the moving section 404 by use of screws 406. The assembly supporting means 407 are installed at 3 places on the carriage 405. Respective assembly supporting means 407 are formed integrally into a unit. Each assembly supporting means 407 is formed in the direction R identical to the axial direction P of the rotary shaft 400 of the carriage 405. The tapped holes 408 are formed on each assembly supporting means 407. The tapped holes 408 are formed, on straight line and in the direction R identical to the axial direction P of rotary shaft 400 onto each assembly supporting means 407. The magnetic head 410 is arranged opposite to the recording face 409 of the magnetic disk 401. The magnetic head 410 is installed at one end of the head supporting section 411. The head supporting section 411 supports the magnetic head 410 with flexibility. The head supporting section 411 and the magnetic head 410 together constitutes the head assembly 412. The tapped through-holes are formed at the other end of the head supporting section 411, in correspondence to the tapped holes 408. The screws 413 pass through the through-holes and engage with the tapped holes 408 to connect to the head assembly 412 to the assembly supporting section 405.

As described in these embodiments, 1st through 10th embodiments, the present invention provides a simple structure and the positional deviation of magnetic head attributable to environmental changes like temperature fluctuation can also be prevented effectively. In addition, the cost can be decreased because the required number of parts is curtailed down and their assembling work is simplified.

In addition, the present invention can be also applied to the actuator mechanism without arms (arm-less) which is not shown in the drawings. It is also possible that a plurality of assembly supporting means are mounted on one head arm. Further, it is possible in such a case that the assembly supporting means are arranged to toward the random direction respectively. The head assembly can be fitted to the assembly supporting means through the spacer or fitted directly not through the spacer.

The material of the arm supporting block is not limited to the specific material. Aluminum, stainless, plastic, etc., can be used as its material.

What is claimed is:

1. A method for assembling a magnetic disk apparatus, comprising the steps of:
    (a) positioning an actuating unit having arms and having a bottom with depressions on a base having protrusions, by mating the protrusions on the base with the depressions on the bottom of the actuating unit;
    (b) fastening a magnetic head assembly to each arm of the actuating unit with a fastening means between each magnetic head assembly and each arm;
    (c) vertically aligning each arm and magnetic head assembly by means of a magnetic head assembly positioning mechanism; and
    (d) temporarily placing a spacer ring between a pair of arms to vertically space the magnetic head assemblies on the pair of arms to assure that the magnetic heads do not contact each other.

2. The method of claim 1, in which step (b) is carried out by the insertion of fastening means between each head assembly and each arm.

3. The method of claim 1, in which the fastening means are screws extending through communicating holes in each head assembly and each arm.

4. A method for assembling an actuator mechanism of a magnetic disk apparatus, comprising the steps of:
    positioning an actuator in which at least first and second assembly supporting means are formed as a unitary body, the at least first and second assembly supporting means having respectively first and second tapped holes formed on a straight line;
    inserting a screwdriver having a shaft and a screw tightening joint section at the tip thereof through the second tapped hole to the first tapped hole;
    arranging a first head assembly having a first magnetic head at one end portion and a first through-hole at the other end portion such that the first through-hole is aligned with the first tapped hole of the first assembly supporting means;
    inserting a first thread member through the first through-hole of the first head assembly from the second assembly supporting means side, said first thread member having a thread portion to be screwed into the first tapped hole and a head section where a joint groove to be engaged with the joint section of the screwdriver is provided;
    engaging the joint section of the screwdriver, the shaft of which has passed through the second tapped hole, with the joint groove of the first thread member;
    turning the screwdriver to screw the first thread member into the first tapped hole to connect the first head assembly to the first assembly supporting means; and
    connecting the second head assembly to the second assembly supporting means with a second thread member.

5. A method for assembling an actuator mechanism of a magnetic disk apparatus, comprising the steps of:
    positioning an actuator in which at least first and second head arms provided with first and second assembly supporting means which are formed as a unitary body, the at least first and second assembly supporting means having respectively first and second tapped holes formed on a straight line;
    inserting a screwdriver having a shaft and a screw tightening joint section at the tip thereof through the second tapped hole to the first tapped hole;
    arranging a first head assembly having a first magnetic head at one end portion and a first through-hole at the other end portion such that the first through-hole is aligned with the first tapped hole of the first assembly supporting means;

inserting a first thread member through the first through-hole of the first head assembly from the second assembly supporting means side, said first thread member having a thread portion to be screwed into the first tapped hole and a head section where a joint groove to be engaged with the joint section of the screwdriver is provided;

engaging the joint section of the screwdriver, the shaft of which has passed through the second tapped hole, with the joint groove of the first thread member;

turning the screwdriver to screw the first thread member into the first tapped hole to connect the first head assembly to the first assembly supporting means; and connecting the second head assembly to the second assembly supporting means with a second thread member.

* * * * *

UNITED STATES PATENT AND TRADEMARK OFFICE
CERTIFICATE OF CORRECTION

PATENT NO. : 5,119,537
DATED : June 9, 1992
INVENTOR(S) : Kunio Hamanaka, et al.

It is certified that error appears in the above-indentified patent and that said Letters Patent is hereby corrected as shown below:

Column 1, line 64, "an" should read --in--;

Column 3, line 10, delete "the".

Column 10, line 6, after "are" insert --formed on the arm mounting section 66c. In addition, numeral--.

Signed and Sealed this

Eleventh Day of June, 1996

Attest:

BRUCE LEHMAN

*Attesting Officer*  *Commissioner of Patents and Trademarks*